US012739747B2

(12) United States Patent
Esswie

(10) Patent No.: US 12,739,747 B2
(45) Date of Patent: Sep. 15, 2026

(54) DEVICE ASSISTED INTERCELL DOWNLINK RADIO SYNCHRONIZATION

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 309 days.

(21) Appl. No.: 18/434,156

(22) Filed: Feb. 6, 2024

(65) Prior Publication Data

US 2025/0254615 A1 Aug. 7, 2025

(51) Int. Cl.
*G08C 17/00* (2006.01)
*H04W 48/08* (2009.01)
*H04W 52/02* (2009.01)

(52) U.S. Cl.
CPC ....... *H04W 52/0212* (2013.01); *H04W 48/08* (2013.01)

(58) Field of Classification Search
CPC ........................... H04W 52/0212; Y02D 30/70
See application file for complete search history.

(56) References Cited

U.S. PATENT DOCUMENTS 8,548,472 B2 * 10/2013 Lim ...................... H04W 48/20 455/436
9,014,143 B2 * 4/2015 Damnjanovic ... H04W 74/0833 370/310.2
2011/0076960 A1 * 3/2011 Yun ....................... H04W 24/10 455/67.14

(Continued)

FOREIGN PATENT DOCUMENTS

CN 115209421 A 10/2022
CN 120050664 A 5/2025

(Continued)

OTHER PUBLICATIONS

Office Action mailed Apr. 1, 2026 for U.S. Appl. No. 18/434,140, 110 pages.
Kreissig, H et al. CN 115209421A, Method And Apparatus For Radio Access Network Planning In A Production Environment, 2022, 22 pages (Year: 2022).

(Continued)

*Primary Examiner* — Shantell L Heiber
(74) *Attorney, Agent, or Firm* — Amin, Turocy & Watson, LLP

(57) ABSTRACT

A macro radio access network node may broadcast a master information block secondary access information indication indicative of secondary access information that may be usable by a user equipment to access a micro radio access network node, corresponding to a micro node coverage zone that overlaps, or lies within, a covered zone corresponding to the macro node, during an activated energy saving mode period, at the micro node, during which the micro node may avoid transmission of synchronization signal block signals. A user equipment operating in an idle mode and located within a coverage zone corresponding to the micro node may detect a synchronization signal block signal transmitted by the macro node and may decode secondary access information, corresponding to the micro node, from a system information block, transmitted by the macro node, indicated by a master information block transmitted by the macro node.

20 Claims, 18 Drawing Sheets

(56) References Cited

U.S. PATENT DOCUMENTS

| | | | | |
|---|---|---|---|---|
| 2012/0015657 | A1* | 1/2012 | Comsa | H04L 5/0048 455/456.6 |
| 2014/0179320 | A1* | 6/2014 | Jang | H04W 36/302 455/436 |
| 2015/0126206 | A1* | 5/2015 | Krishnamurthy | H04W 56/001 455/452.1 |
| 2015/0223148 | A1* | 8/2015 | Shi | H04W 52/0216 370/312 |
| 2017/0230846 | A1 | 8/2017 | Wang | |
| 2017/0311217 | A1* | 10/2017 | Jung | H04W 36/04 |
| 2017/0332325 | A1* | 11/2017 | Nan | H04W 52/0219 |
| 2018/0103429 | A1* | 4/2018 | Chou | H04W 52/0229 |
| 2018/0167911 | A1* | 6/2018 | Kota | H04W 72/02 |
| 2018/0324702 | A1* | 11/2018 | Takahashi | H04W 52/0245 |
| 2021/0410181 | A1* | 12/2021 | Jeon | H04W 52/0258 |
| 2022/0286837 | A1 | 9/2022 | Yang | |
| 2022/0312534 | A1* | 9/2022 | Hao | H04W 76/18 |
| 2023/0345337 | A1 | 10/2023 | Gundavelli | |
| 2023/0389120 | A1* | 11/2023 | Babaei | H04W 52/0235 |
| 2023/0413072 | A1 | 12/2023 | Chowdhury | |
| 2024/0349069 | A1 | 10/2024 | Soulhi | |
| 2024/0422077 | A1 | 12/2024 | Gad | |
| 2025/0254604 | A1 | 8/2025 | Esswie | |

FOREIGN PATENT DOCUMENTS

| | | | |
|---|---|---|---|
| EP | 2706775 | A1 | 3/2014 |
| WO | 2014051513 | A1 | 4/2014 |
| WO | 2020069032 | A1 | 4/2020 |

OTHER PUBLICATIONS

Zhou Y, CN 120050664 A, Method For Information Transmission Receiving Key Performance Index Related Information Of Third Network Element In Radio Access Network Sent By Second Network Element In Radio Access Network, And Using Key, 2 pages (Year: 2023).

CN120050664A—Information transmission method and device and communication equipment, 16 pages—Google Patent (Year: 2023).

* cited by examiner 100
110
110
110
110
210
205
115
115
115
115
115
115
125
125
125
125
125
125
135
135
137
117
105
105
105
120
120
120
120
CORE NETWORK 130
INTERNET SERVICES 150
140
145
145

| Access performance map | | | |
|---|---|---|---|
| Coverage zone 0 | Timing advance 0 | Received coverage 0 | Downlink sync offset 0 |
| Coverage zone 1 | Timing advance 1 | Received coverage 1 | Downlink sync offset 1 |
| : | : | : | : |
| : | : | : | : |
| Coverage zone *N* | Timing advance *N* | Received coverage *N* | Downlink sync offset *N* |

Figure 7:
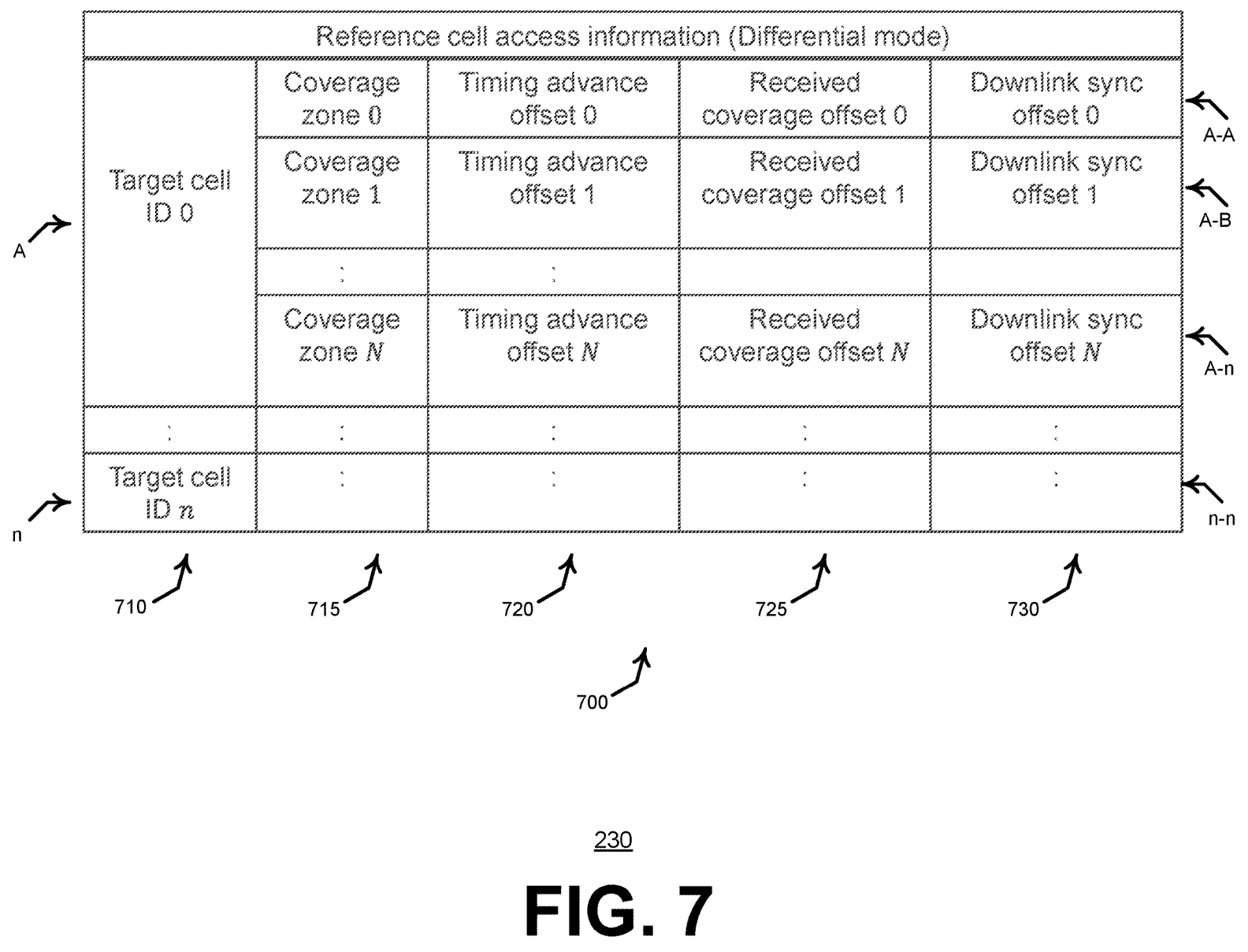

| Reference cell access information (Differential mode) | | | | | |
|---|---|---|---|---|---|
| | Target cell ID 0 | Coverage zone 0 | Timing advance offset 0 | Received coverage offset 0 | Downlink sync offset 0 |
| | | Coverage zone 1 | Timing advance offset 1 | Received coverage offset 1 | Downlink sync offset 1 |
| | | ⋮ | ⋮ | | |
| | | Coverage zone *N* | Timing advance offset *N* | Received coverage offset *N* | Downlink sync offset *N* |
| | ⋮ | ⋮ | ⋮ | ⋮ | ⋮ |
| | Target cell ID *n* | ⋮ | ⋮ | ⋮ | ⋮ |

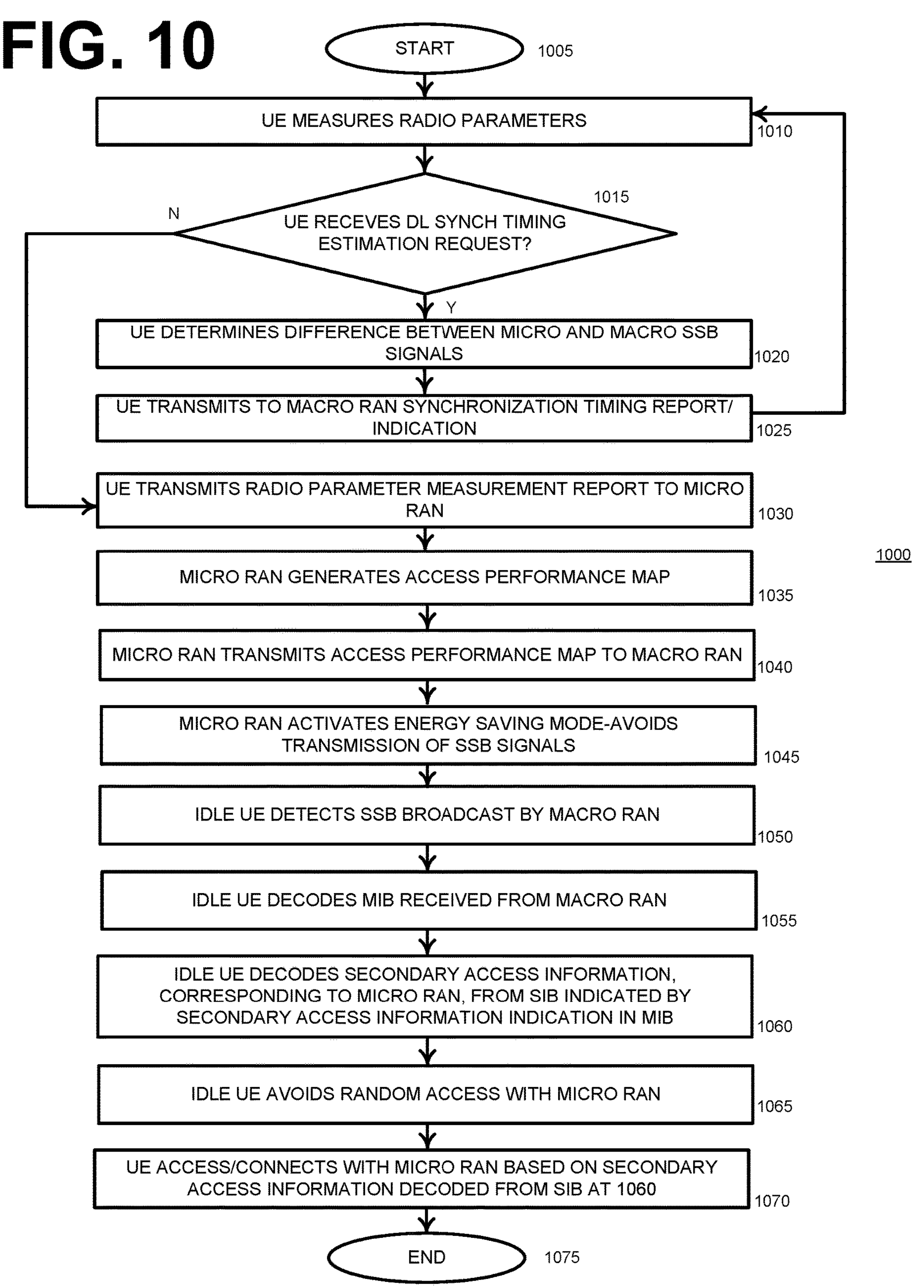
FIG. 10
START
1005
UE MEASURES RADIO PARAMETERS
1010
1015
N
UE RECEVES DL SYNCH TIMING ESTIMATION REQUEST?
Y
UE DETERMINES DIFFERENCE BETWEEN MICRO AND MACRO SSB SIGNALS
1020
UE TRANSMITS TO MACRO RAN SYNCHRONIZATION TIMING REPORT/ INDICATION
1025
UE TRANSMITS RADIO PARAMETER MEASUREMENT REPORT TO MICRO RAN
1030
1000
MICRO RAN GENERATES ACCESS PERFORMANCE MAP
1035
MICRO RAN TRANSMITS ACCESS PERFORMANCE MAP TO MACRO RAN
1040
MICRO RAN ACTIVATES ENERGY SAVING MODE-AVOIDS TRANSMISSION OF SSB SIGNALS
1045
IDLE UE DETECTS SSB BROADCAST BY MACRO RAN
1050
IDLE UE DECODES MIB RECEIVED FROM MACRO RAN
1055
IDLE UE DECODES SECONDARY ACCESS INFORMATION, CORRESPONDING TO MICRO RAN, FROM SIB INDICATED BY SECONDARY ACCESS INFORMATION INDICATION IN MIB
1060
IDLE UE AVOIDS RANDOM ACCESS WITH MICRO RAN
1065
UE ACCESS/CONNECTS WITH MICRO RAN BASED ON SECONDARY ACCESS INFORMATION DECODED FROM SIB AT 1060
1070
END
1075

FIG. 11

Figure 12:
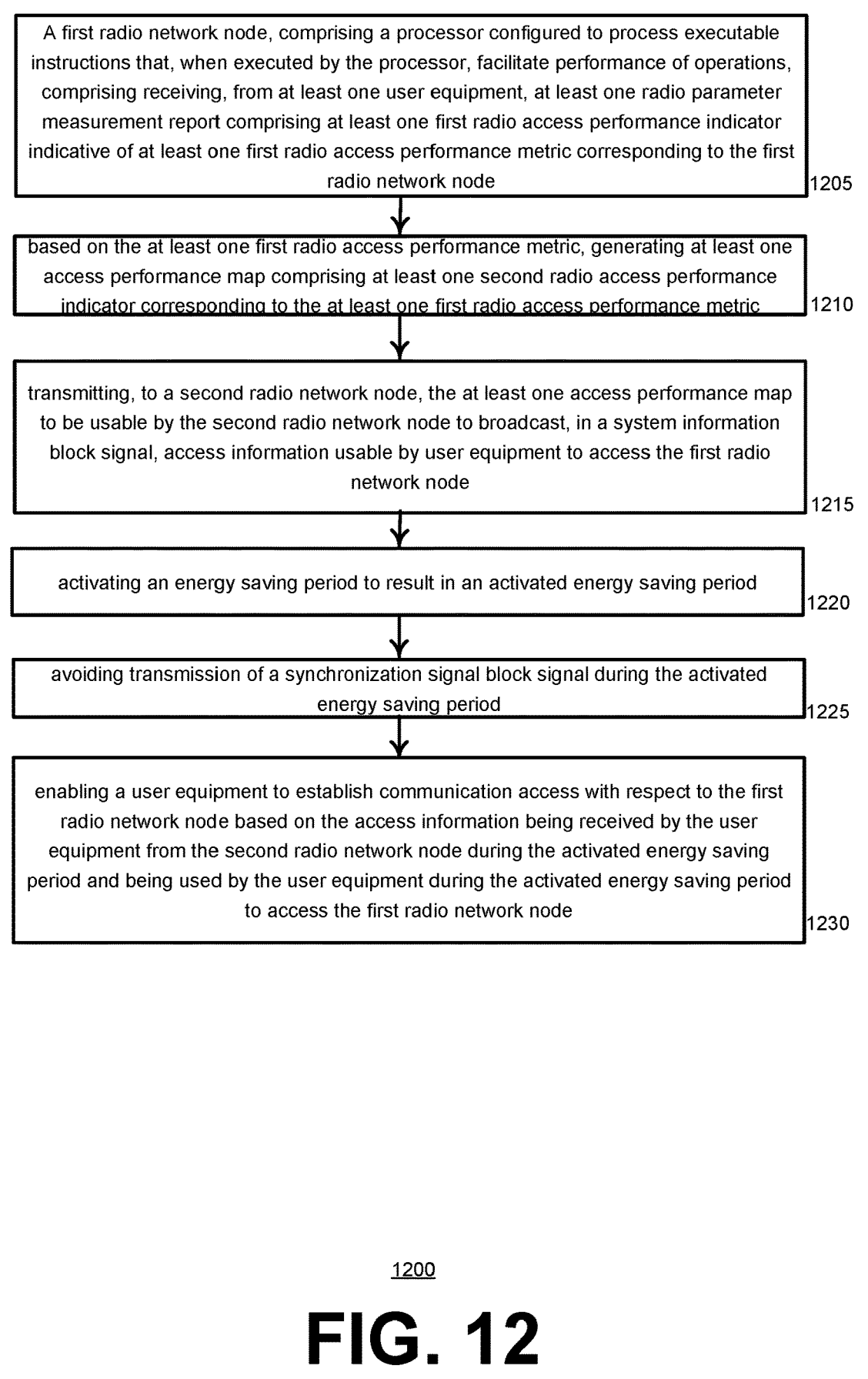

A first radio network node, comprising a processor configured to process executable instructions that, when executed by the processor, facilitate performance of operations, comprising receiving, from at least one user equipment, at least one radio parameter measurement report comprising at least one first radio access performance indicator indicative of at least one first radio access performance metric corresponding to the first radio network node

1205 based on the at least one first radio access performance metric, generating at least one access performance map comprising at least one second radio access performance indicator corresponding to the at least one first radio access performance metric

1210 transmitting, to a second radio network node, the at least one access performance map to be usable by the second radio network node to broadcast, in a system information block signal, access information usable by user equipment to access the first radio network node

1215 activating an energy saving period to result in an activated energy saving period

1220 avoiding transmission of a synchronization signal block signal during the activated energy saving period

1225 enabling a user equipment to establish communication access with respect to the first radio network node based on the access information being received by the user equipment from the second radio network node during the activated energy saving period and being used by the user equipment during the activated energy saving period to access the first radio network node

Figure 13:
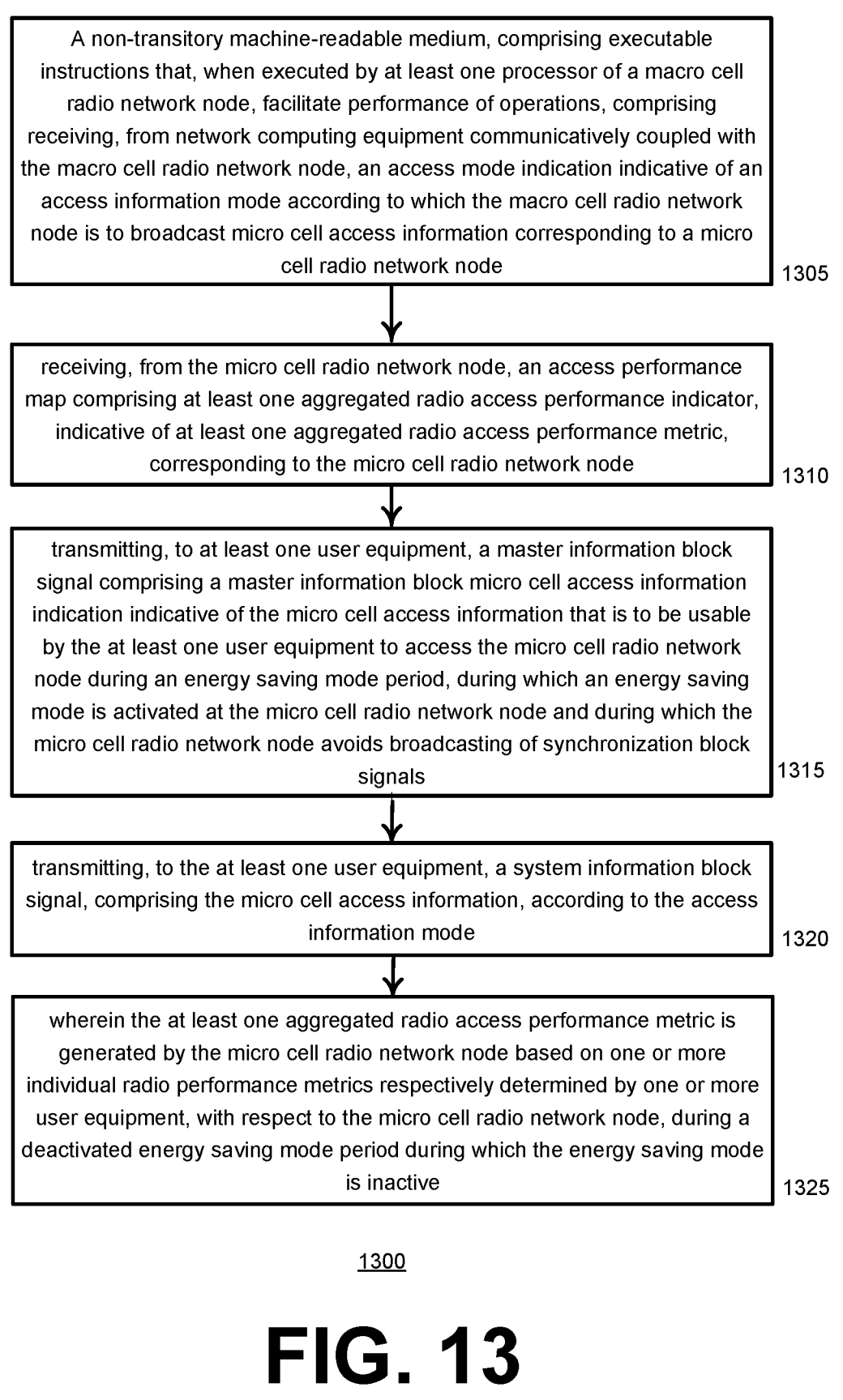

A non-transitory machine-readable medium, comprising executable instructions that, when executed by at least one processor of a macro cell radio network node, facilitate performance of operations, comprising receiving, from network computing equipment communicatively coupled with the macro cell radio network node, an access mode indication indicative of an access information mode according to which the macro cell radio network node is to broadcast micro cell access information corresponding to a micro cell radio network node

1305 receiving, from the micro cell radio network node, an access performance map comprising at least one aggregated radio access performance indicator, indicative of at least one aggregated radio access performance metric, corresponding to the micro cell radio network node

1310 transmitting, to at least one user equipment, a master information block signal comprising a master information block micro cell access information indication indicative of the micro cell access information that is to be usable by the at least one user equipment to access the micro cell radio network node during an energy saving mode period, during which an energy saving mode is activated at the micro cell radio network node and during which the micro cell radio network node avoids broadcasting of synchronization block signals

1315 transmitting, to the at least one user equipment, a system information block signal, comprising the micro cell access information, according to the access information mode

1320 wherein the at least one aggregated radio access performance metric is generated by the micro cell radio network node based on one or more individual radio performance metrics respectively determined by one or more user equipment, with respect to the micro cell radio network node, during a deactivated energy saving mode period during which the energy saving mode is inactive

Figure 14:
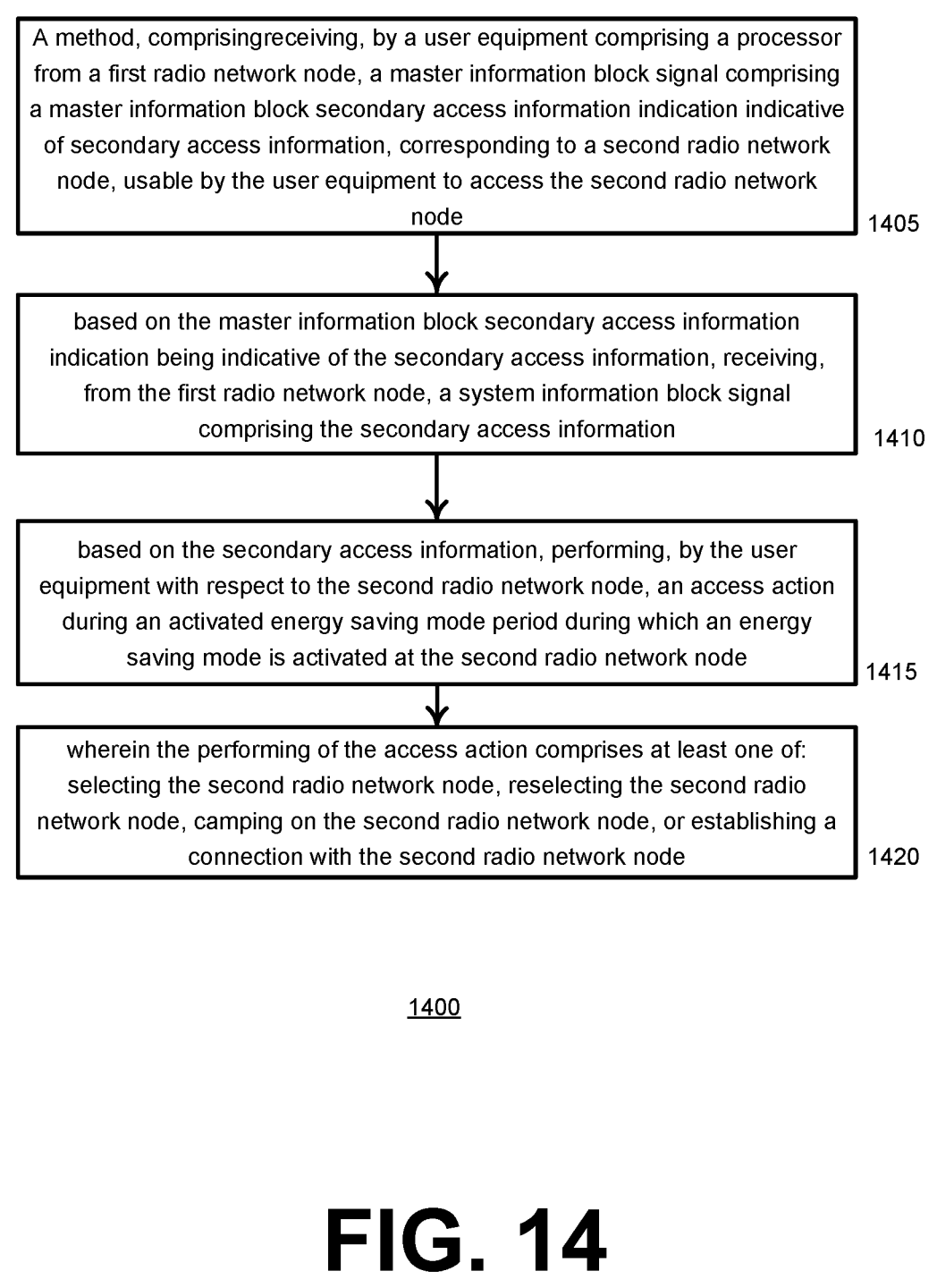

A method, comprisingreceiving, by a user equipment comprising a processor from a first radio network node, a master information block signal comprising a master information block secondary access information indication indicative of secondary access information, corresponding to a second radio network node, usable by the user equipment to access the second radio network node

1405 based on the master information block secondary access information indication being indicative of the secondary access information, receiving, from the first radio network node, a system information block signal comprising the secondary access information

1410 based on the secondary access information, performing, by the user equipment with respect to the second radio network node, an access action during an activated energy saving mode period during which an energy saving mode is activated at the second radio network node

1415 wherein the performing of the access action comprises at least one of: selecting the second radio network node, reselecting the second radio network node, camping on the second radio network node, or establishing a connection with the second radio network node

Figure 15:
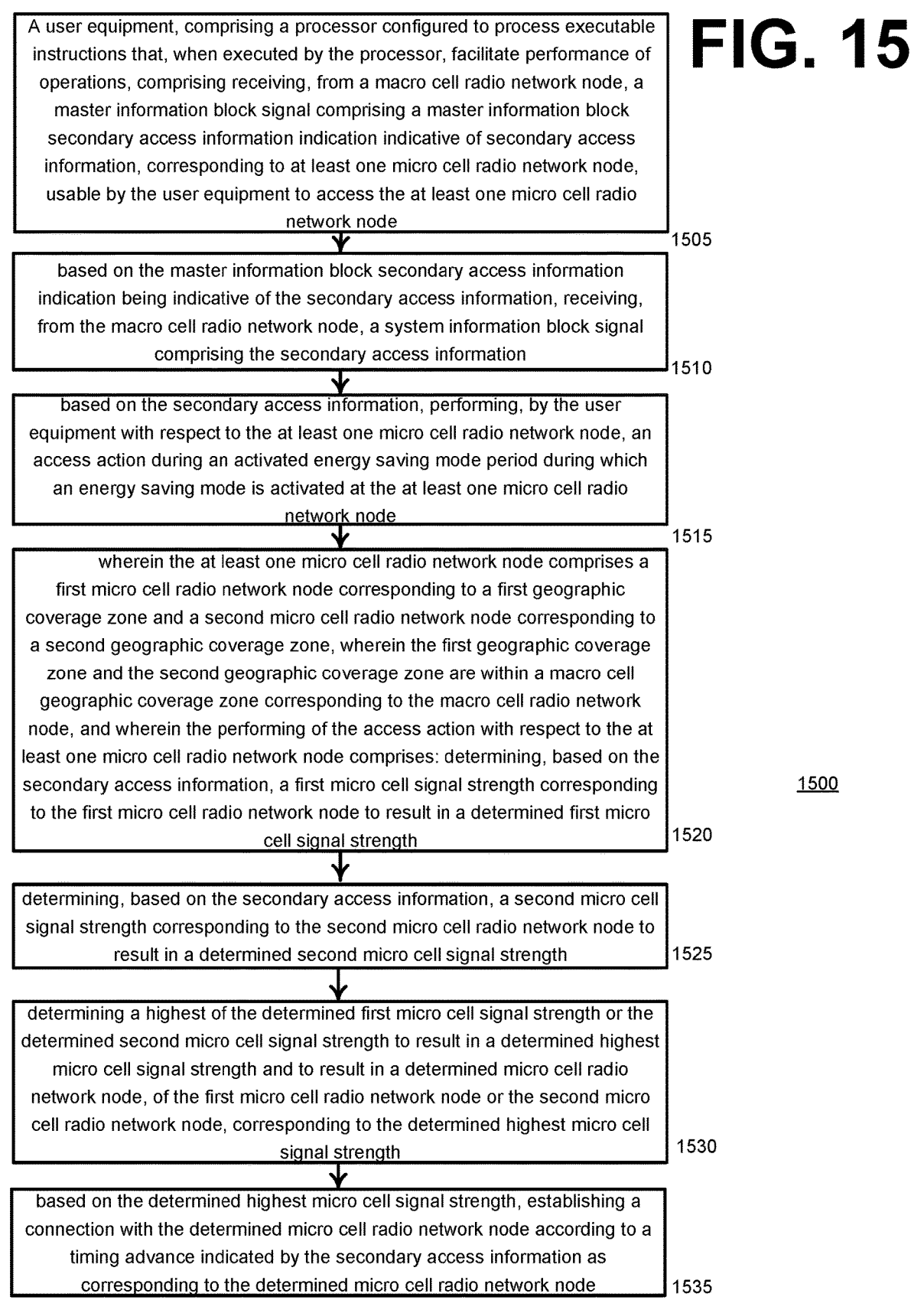

A user equipment, comprising a processor configured to process executable instructions that, when executed by the processor, facilitate performance of operations, comprising receiving, from a macro cell radio network node, a master information block signal comprising a master information block secondary access information indication indicative of secondary access information, corresponding to at least one micro cell radio network node, usable by the user equipment to access the at least one micro cell radio network node

1505 based on the master information block secondary access information indication being indicative of the secondary access information, receiving, from the macro cell radio network node, a system information block signal comprising the secondary access information

1510 based on the secondary access information, performing, by the user equipment with respect to the at least one micro cell radio network node, an access action during an activated energy saving mode period during which an energy saving mode is activated at the at least one micro cell radio network node

1515 wherein the at least one micro cell radio network node comprises a first micro cell radio network node corresponding to a first geographic coverage zone and a second micro cell radio network node corresponding to a second geographic coverage zone, wherein the first geographic coverage zone and the second geographic coverage zone are within a macro cell geographic coverage zone corresponding to the macro cell radio network node, and wherein the performing of the access action with respect to the at least one micro cell radio network node comprises: determining, based on the secondary access information, a first micro cell signal strength corresponding to the first micro cell radio network node to result in a determined first micro cell signal strength

1520 determining, based on the secondary access information, a second micro cell signal strength corresponding to the second micro cell radio network node to result in a determined second micro cell signal strength

1525 determining a highest of the determined first micro cell signal strength or the determined second micro cell signal strength to result in a determined highest micro cell signal strength and to result in a determined micro cell radio network node, of the first micro cell radio network node or the second micro cell radio network node, corresponding to the determined highest micro cell signal strength

1530 based on the determined highest micro cell signal strength, establishing a connection with the determined micro cell radio network node according to a timing advance indicated by the secondary access information as corresponding to the determined micro cell radio network node

DEVICE ASSISTED INTERCELL DOWNLINK RADIO SYNCHRONIZATION

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

A synchronization signal block ("SSB") facilitates cell radio node identification and camping. During idle mode, a user equipment device typically periodically wakes up and attempts to decode SSBs transmitted by one or more radio nodes corresponding to one or more surrounding cells. An SSB signal typically comprises signals, transmitted to facilitate idle mode devices being made aware of radio information corresponding to the radio network node transmitting the SSB signal. An SSB signal may comprise an identifier corresponding to the radio network node transmitting the SSB signal, a reference signal specific to the radio network node to facilitate detecting signal strength, which may be referred to as a coverage level, received from the transmitting radio network node. An SSB signal may comprise bandwidth supported by the radio network node transmitting the SSB signal, an antenna setup/configuration corresponding to the radio network node transmitting the SSB signal, and radio timing information radio network node transmitting the SSB signal. An SSB signal set may comprise a primary synchronization signal ("PSS"), a secondary synchronization signa ("SSS"), one or more demodulation reference signals ("DMRS"), and a physical broadcast channel ("PBCH") that may include: Bandwidth setup information: antenna setup information, control search space information in a first system information block ("SIB"), and system frame number ("SFN") timing information.

User equipment operating in an idle mode may use received and combine PSS and SSS sequence information to use in determining an identifier corresponding to the radio network node transmitting the PSS and SSS signals. Also, based on a received DMRS, a user equipment operating in an idle mode be able to determine a received coverage level corresponding to a radio network node transmitting the DMRS and related channel conditions between the user equipment and the radio network node. A user equipment can decode a PBCH and extract the broadcast information therefrom.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a first radio network node comprising at least one processor, broadcasting a master information block signal comprising a master information block secondary access information indication indicative of secondary access information, corresponding to a second radio network node, usable by user equipment to access the second radio network node, and facilitating, by the first radio network node, broadcasting a system information block signal comprising the secondary access information.

The secondary access information may comprise explicit access information corresponding to the second radio network node. Explicit information may be used by the user equipment to access the second radio network node without the user equipment calculating access information corresponding to the second radio network node based on differential access information applied to access information corresponding to the first radio network node. Explicit access information may be direct access information insofar as the information may not require calculation with respect to access information corresponding to the second radio network node to determine the secondary access information that is usable by a user equipment to access the second radio network node.

In an embodiment, the secondary access information comprises differential access information, corresponding to the second radio network node, that is to be applicable, by the user equipment, to primary access information corresponding to the first radio network node, to determine, by the user equipment, explicit access information corresponding to the second radio network node.

In an embodiment, the method may further comprise facilitating, by the first radio network node, receiving, from network computing equipment communicatively coupled with the first radio network node, an access mode indication indicative of an access information mode according to which the first radio network node is to broadcast the secondary access information via the system information block signal.

The access information mode may be one of: an explicit mode corresponding to the secondary access information being broadcast via the system information block signal as explicit access information, or a differential mode corresponding to the secondary access information being broadcast via the system information block signal as differential access information usable by the user equipment to determine explicit access information corresponding to the second radio network node by applying the differential access information to primary access information corresponding to the first radio network node.

In an embodiment, the method may further comprise facilitating, by the first radio network node, receiving, from the second radio network node, an access performance map comprising at least one radio access performance indicator indicative of at least one radio access performance metric corresponding to the second radio network node. The at least one radio access performance metric may comprise at least one of: a timing advance corresponding to the second radio network node, or a received signal strength value corresponding to a signal strength of an access signal received by at least one user equipment from the second radio network node. In an embodiment, the at least one radio access performance metric may be determined by the second radio network node based on at least one radio parameter measurement report transmitted by at least one user equipment to the second radio network node. In an embodiment, the method may further comprise determining, by the first radio network node, the secondary access information based on the at least one radio access performance metric.

In an embodiment, the secondary access information may comprise at least one of: a node identifier associated with the second radio network node, a timing advance corresponding to the second radio network node, a received signal strength value indicative of a signal strength corresponding to a geographic zone associated with the second radio network node, or a downlink synchronization timing value corresponding to the second radio network node.

In another example embodiment, a first radio network node, comprising a processor configured to process executable instructions that, when executed by the processor, facilitate performance of operations that may comprise receiving, from at least one user equipment, at least one radio parameter measurement report comprising at least one first radio access performance indicator indicative of at least one first radio access performance metric corresponding to the first radio network node. Based on the at least one first radio access performance metric, generating at least one access performance map comprising at least one second radio access performance indicator corresponding to the at least one first radio access performance metric. The operations may further comprise transmitting, to a second radio network node, the at least one access performance map to be usable by the second radio network node to broadcast, in a system information block signal, access information usable by user equipment to access the first radio network node.

In an embodiment, the at least one radio parameter measurement report may comprise multiple radio parameter reports received from multiple user equipment. Multiple first radio access performance metrics, indicated by multiple first radio access performance indicators in the multiple radio parameter reports, may correspond to the first radio network node. The generating of the at least one access performance map may comprise applying at least one function, which may be a statistical function such as averaging, to the multiple first radio access performance metrics to result in the at least one second radio access performance indicator.

In an embodiment, the multiple first radio access performance metrics may be multiple timing advance values corresponding to the multiple user equipment with respect to the first radio network node (e.g., timing advance values determined by the multiple user equipment to be usable by the multiple user equipment to access the first radio network node). The at least one second radio access performance indicator may be a derived timing advance value that results from applying the at least one function, which may be a statistical function such as averaging, to the multiple first radio access performance metrics, and wherein the derived timing advance value is usable by user equipment to access the first radio network node during an activated energy saving period, at the first radio network node, during which the first radio network node avoids broadcasting of synchronization signal block signals.

In an embodiment, the operations may further comprise activating an energy saving period to result in an activated energy saving period, avoiding transmission of a synchronization signal block signal during the activated energy saving period. The operations may further comprise enabling a user equipment to establish communication access with respect to the first radio network node based on the access information being received by the user equipment from the second radio network node during the activated energy saving period and being used by the user equipment during the activated energy saving period to access the first radio network node. The operations may further comprise establishing a communication access with the user based on the access information being received by the user equipment from the second radio network node during the activated energy saving period and being used by the user equipment during the activated energy saving period to access the first radio network node.

In an embodiment, the operations may further comprise deactivating an energy saving mode during an energy saving period to result in a deactivated energy saving period. The at least one radio parameter measurement report may be received from the at least one user equipment during the deactivated energy saving period.

In an embodiment, the first radio network node may correspond to a first geographic coverage zone. The second radio network node may correspond to a second geographic coverage zone. The second geographic coverage zone may geographically surround or substantially surround the first geographic coverage zone. The second geographic coverage zone may geographically overlap the first geographic coverage zone.

In an embodiment, the first radio network node may correspond to a micro cell that increases radio capacity with respect to the second radio network node (e.g., the first radio network node may be referred to as a micro radio network node and may add radio resources, such as frequency resources or timing resources, that are available to user equipment located in a micro node coverage zone that corresponds to the micro node wherein the micro node coverage zone lies within, or overlaps, a coverage zone corresponding to the second radio network node, which may be referred to as a macro radio network node).

In yet another example embodiment, a non-transitory machine-readable medium, comprising executable instructions that, when executed by at least one processor of a macro cell radio network node, facilitate performance of operations that comprise receiving, from network computing equipment communicatively coupled with the macro cell radio network node, an access mode indication indicative of an access information mode according to which the macro cell radio network node is to broadcast micro cell access information corresponding to a micro cell radio network node. The network equipment may comprise core network equipment. The operations may further comprise receiving, from the micro cell radio network node, an access performance map comprising at least one aggregated radio access performance indicator, indicative of at least one aggregated radio access performance metric, corresponding to the micro cell radio network node. The operations may further comprise transmitting, to at least one user equipment, a master information block signal comprising a master information block micro cell access information indication indicative of the micro cell access information that is to be usable by the at least one user equipment to access the micro cell radio network node during an energy saving mode period, during which an energy saving mode is activated at the micro cell radio network node and during which the micro cell radio network node avoids broadcasting of synchronization block signals. The operations may further comprise transmitting, to the at least one user equipment, a system information block signal, comprising the micro cell access information, according to the access information mode.

The at least one aggregated radio access performance metric may be generated by the micro cell radio network node based on one or more individual radio performance metrics respectively determined by one or more user equipment, with respect to the micro cell radio network node, during a deactivated energy saving mode period during which the energy saving mode is inactive. The at least one aggregated radio access performance metric maybe generated by applying a function, for example a statistical function, to one or more measurements determined by the one or more user equipment. For example one or more user equipment may determine a one or more timing advance value(s) or a signal strength value(s) with respect to the micro cell radio network node in the microcell radio network node may average the timing advance value(s) or signal strength value(s) to result in an aggregated timing advance value corresponding to the micro cell radio network node or an aggregated signal strength value corresponding to the microcell radio network node. The macro cell radio network node may correspond to a macro cell geographic signal coverage zone. The micro cell radio network node corresponds to a micro cell geographic signal coverage zone. The micro cell geographic signal coverage zone may be located within the macro cell geographic signal coverage zone.

Another example embodiment method may comprise receiving, by a user equipment comprising a processor from a first radio network node, a master information block signal comprising a master information block secondary access information indication indicative of secondary access information, corresponding to a second radio network node, usable by the user equipment to access the second radio network node. Based on the master information block secondary access information indication being indicative of the secondary access information, the method may further comprise receiving, from the first radio network node, a system information block signal comprising the secondary access information. Based on the secondary access information, the method may further comprise performing, by the user equipment with respect to the second radio network node, an access action during an activated energy saving mode period during which an energy saving mode is activated at the second radio network node. The performing of the access action may comprise at least one of: selecting the second radio network node, reselecting the second radio network node, camping on the second radio network node, or establishing a connection with the second radio network node.

In an embodiment, the second radio network node may avoid transmitting synchronization signal block signals during the activated energy saving mode period.

In an embodiment, the secondary access information may comprise differential access information, corresponding to the second radio network node, that is to be applicable, by the user equipment, to primary access information corresponding to the first radio network node, to determine, by the user equipment, explicit, or direct, access information corresponding to the second radio network node.

In an embodiment, during a deactivated energy saving mode period, during which the energy saving mode is deactivated at the second radio network node, the method may further comprise determining, by the user equipment, at least one radio parameter metric with respect to the second radio network node. The method may further comprise transmitting, by the user equipment to the second radio network node, the at least one radio parameter metric via respective at least one radio parameter metric reports. The at least one radio parameter metric may be usable by the second radio network node to generate at least one access performance map comprising at least one radio access performance indicator, indicative of at least one radio access performance metric, corresponding to the second radio network node. The at least one radio access performance indicator in the at least one access performance map may be usable by the first radio network node to broadcast as the secondary access information in the system information block signal.

In an embodiment, the determining of the at least one radio parameter metric with respect to the second radio network node may comprise based on a synchronization signal block signal transmitted by the second radio network node during the deactivated energy saving mode period, determining, by the user equipment, a time difference between a time clock corresponding to the user equipment and a time reference value indicated in the synchronization signal block signal to result in a determined time difference. The at least one radio parameter metric determined with respect to the second radio network node may comprise the determined time difference.

In an embodiment, the determining of the at least one radio parameter metric with respect to the second radio network node may comprise determining, based on a first synchronization signal block signal transmitted by the first radio network node, a first time difference between a time clock corresponding to the user equipment and a first time reference value indicated in the first synchronization signal block signal to result in a determined first time difference. Based on a second synchronization signal block signal transmitted by the second radio network node during the deactivated energy saving mode period, the determining of the at least one radio parameter metric with respect to the second radio network node may comprise determining a second time difference between the time clock corresponding to the user equipment and a second time reference value indicated in the second synchronization signal block signal to result in a determined second time difference, and, based on an offset difference between the determined first time difference and the determined second time difference, determining a downlink synchronization offset. The at least one radio parameter metric determined with respect to the second radio network node may comprise the downlink synchronization offset.

In an embodiment, the performing of the access action may further comprise, based on a signal strength, corresponding to the second radio network node, indicated by the secondary access information, determining to select the second radio network node, and using a timing advance value, indicated by the secondary access information, establishing a connection with the second radio network node. The establishing of the connection with the second radio network node may comprise avoiding performance of random access with the second radio network node.

The first radio network node may correspond to a first geographic signal coverage zone. The second radio network node may correspond to a second geographic signal coverage zone. The second geographic signal coverage zone may be within the first geographic signal coverage zone.

In another embodiment, a user equipment may comprise a processor configured to process executable instructions that, when executed by the processor, facilitate performance of operations that comprising receiving, from a macro cell radio network node, a master information block signal comprising a master information block secondary access information indication indicative of secondary access information, corresponding to at least one micro cell radio network node, usable by the user equipment to access the at least one micro cell radio network node. Based on the master information block secondary access information indication being indicative of the secondary access information, the operations may further comprise receiving, from the macro cell radio network node, a system information block signal comprising the secondary access information. Based on the secondary access information, performing, by the user equipment with respect to the at least one micro cell radio network node, an access action during an activated energy saving mode period during which an energy saving mode is activated at the at least one micro cell radio network node.

The at least one micro cell radio network node may comprise a first micro cell radio network node corresponding to a first geographic coverage zone and a second micro cell radio network node corresponding to a second geographic coverage zone. The first geographic coverage zone and the second geographic coverage zone may be within a macro cell geographic coverage zone corresponding to the macro cell radio network node.

The performing of the access action with respect to the at least one micro cell radio network node may comprise determining, based on the secondary access information, a first micro cell signal strength corresponding to the first micro cell radio network node to result in a determined first micro cell signal strength and determining, based on the secondary access information, a second micro cell signal strength corresponding to the second micro cell radio network node to result in a determined second micro cell signal strength. The performing of the access action with respect to the at least one micro cell radio network node may comprise determining a highest of the determined first micro cell signal strength or the determined second micro cell signal strength to result in a determined highest micro cell signal strength and to result in a determined micro cell radio network node, of the first micro cell radio network node or the second micro cell radio network node, corresponding to the determined highest micro cell signal strength. Based on the determined highest micro cell signal strength, the performing of the access action with respect to the at least one micro cell radio network node may comprise establishing a connection with the determined micro cell radio network node according to a timing advance indicated by the secondary access information as corresponding to the determined micro cell radio network node.

In an embodiment, the operations may further comprise determining, during a deactivation period during which the energy saving mode is inactivated at the at least one micro cell radio network node, at least one radio parameter metric corresponding to the at least one micro cell radio network node to result in a determined at least one radio parameter metric, and transmitting, to the at the at least one micro cell radio network node, at least one radio parameter metric report comprising the determined at least one radio parameter metric. The secondary access information may be based on the determined at least one radio parameter metric.

In an embodiment, the user equipment may be a first user equipment. The secondary access information may be based on at least one radio parameter metric, corresponding to the at least one micro cell radio network node, indicated in at least one radio parameter metric report transmitted to the at least one micro cell radio network node by a second user equipment.

In an embodiment, the operations may further comprise determining, based on a first synchronization signal block signal transmitted by the macro cell radio network node, a first time difference between a time clock corresponding to the user equipment and a first time reference value indicated in the first synchronization signal block signal to result in a determined first time difference, and, based on at least one second synchronization signal block signal transmitted by the at least one micro cell radio network node during a deactivated energy saving mode period during which an energy saving mode at the at least one micro cell radio network node is inactive, determining at least one second time difference between the time clock corresponding to the user equipment and at least one second time reference value indicated in the at least one second synchronization signal block signal to result in at least one determined second time difference. The operations may further comprise determining, based on an offset difference between the determined first time difference and the at least one determined second time difference, a downlink synchronization offset. The secondary access information may comprise the downlink synchronization offset.

In yet another embodiment example, a non-transitory machine-readable medium may comprising executable instructions that, when executed by a processor of a user equipment, facilitate performance of operations comprising receiving, from a first radio network node, a master information block signal comprising a master information block secondary access information indication indicative of secondary access information, corresponding to a second radio network node, usable by the user equipment to access the second radio network node. Based on the master information block secondary access information indication being indicative of the secondary access information being broadcast via a secondary access information system information block, the operations may further comprise receiving, from the first radio network node, a system information block signal comprising the secondary access information system information block. Based on the secondary access information, the operations may further comprise performing, with respect to the second radio network node, an access action during an activated energy saving mode period during which an energy saving mode is activated at the second radio network node.

In an embodiment, the secondary access information system information block may indicate the secondary access information according to an access information mode that is one of: an explicit mode corresponding to the secondary access information being broadcast via the secondary access information system information block signal as explicit access information, or a differential mode corresponding to the secondary access information being broadcast via the secondary access information system information block signal as differential access information usable by the user equipment to determine explicit access information corresponding to the second radio network node by applying the differential access information to primary access information corresponding to the first radio network node.

In an embodiment, the user equipment may be a first user equipment. The operations may further comprise receiving, from the first radio network node, a downlink synchronization timing estimation request. Responsive to the downlink synchronization timing estimation request, the operations may further comprise determining a first synchronization time value corresponding to a first synchronization signal block signal broadcast by the first radio network node. Responsive to the downlink synchronization timing estimation request, the operations may further comprise determining a second synchronization time value corresponding to a second synchronization signal block signal broadcast by the second radio network node during a deactivated energy saving mode period during which the energy saving mode is inactivated at the second radio network node. The operations may further comprise determining a synchronization time difference between the first synchronization time value and the second synchronization time value to result in a determined synchronization time difference. The operations may further comprise transmitting, to the first radio network node, a synchronization time difference indication indicative of the determined synchronization time difference to be usable by the first radio network node to indicate to a second user equipment the determined synchronization time difference to be usable by the second user equipment to synchronize a clock corresponding to the second user equipment to facilitate use of the secondary access information to access, by the second user equipment, the second radio network node while the energy saving mode is activated at the second radio network node.

The first radio network node may correspond to a first geographic coverage zone. The second radio network node may correspond to a second geographic coverage zone that lies with the first geographic coverage zone. The third radio network node may correspond to a third geographic coverage zone that lies with the first geographic coverage zone. The secondary access information may comprise access information corresponding to the third radio network node. The performing of the access action may comprise determining a first signal strength corresponding to the second radio network node, determining a second signal strength corresponding to the third radio network node, determining a highest of the first signal strength or the second signal strength to result in a determined highest signal strength, and determining the second radio network node or the third radio network node corresponding to the determined highest signal strength to result in a determined radio network node. The performing of the access action may comprise determining, from the secondary access information, a timing advance value corresponding to the determined radio network node to result in a determined timing advance, and accessing the determined radio network node according to the determined timing advance. The performing of the access action may further comprise avoiding transmission of an uplink preamble to the determined radio network node.

BRIEF DESCRIPTION OF THE DRAWINGS

FIG. 5 illustrates an example access performance map.

FIG. 7 illustrates example differential access information corresponding to a micro radio network node.

FIG. 10 illustrates a flow diagram of an example method to facilitating a user equipment accessing, or connecting to, a micro radio node that is avoiding broadcasting of synchronization signal block signals.

FIG. 11 illustrates a block diagram of an example method.

FIG. 12 illustrates a block diagram of an example network node.

FIG. 13 illustrates a block diagram of an example non-transitory machine-readable medium.

FIG. 14 illustrates a block diagram of an example method.

FIG. 15 illustrates a block diagram of an example user equipment.

FIG. 16 illustrates a block diagram of an example non-transitory machine-readable medium.

DETAILED DESCRIPTION OF THE DRAWINGS

Figure 1:
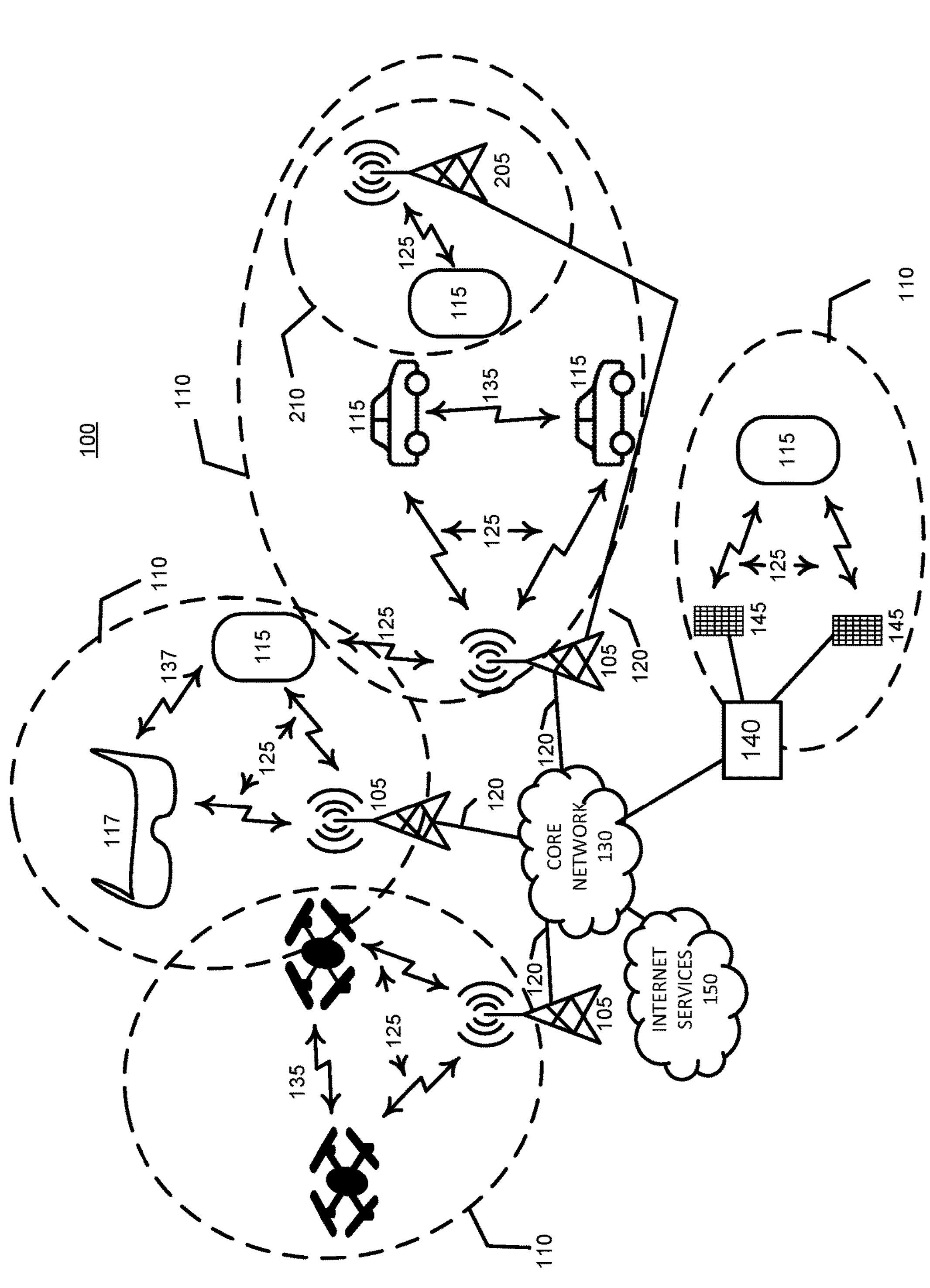
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 17.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term “cell” may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally. or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In embodiments disclosed herein, a base station 105 may be referred to as a primary, master, reference, or macro base station/node, for example a RAN node that may correspond to a macro cell. A node 205 may be referred to as a secondary, slave, target, or micro base station/node that may correspond to a micro cell. A node 205 and a UE 115 may wirelessly communicate via one or more communication links 125. A node 205 may facilitate a coverage area 210 over which UEs 115 and the base station 205 may establish one or more communication links 125. Coverage area 210 may be an example of a geographic area, or zone, with respect to which a base station 205 and a UE 115 may support the communication of signals according to one or more radio access technologies.

Heterogeneous network deployments (e.g., a communication network comprising a macro RAN node and a micro RAN node) may facilitate wireless communication with one or more small/micro RAN node deployed within coverage of a master/reference macro RAN node. Micro RAN nodes may be deployed to deliver enhanced downlink or uplink capacity within certain coverage subareas with a high presence density of user equipment such that potential radio resource congestion may be mitigated by the master/macro RAN node dynamically relaxing or offloading the facilitating of traffic delivery to one or more micro RAN nodes. Although conventional deployments of heterogeneous networks may increase radio capacity with respect to a network that uses a macro node without using a micro node, respective performance criterion with respect to signalling overhead and node energy consumption may be relaxed. For example, conventional deployments of heterogeneous wireless networks may be operated with the assumption that a micro RAN node may not be operated with constrains on energy consumption (e.g., a micro cell, serving a device-congested mall or hall area, is assumed to have no power supply constraints, such as cost or a limited battery charge).

According to conventional techniques, a macro RAN node and micro RAN nodes always perform regular and frequent (e.g., periodic) transmissions of synchronization signal block ("SSB") signals. According to conventional techniques, transmission of SSB signals is mandatory to facilitate providing of basic timing and access information to user equipment operating in idle mode, inactive mode, or a standby mode (without transmitted SSBs user equipment devices may not detect the presence of a RAN node). Since small/micro nodes, for example those in a heterogeneous network deployment with overlapping coverage zone(s) with respect to a coverage area corresponding to a macro RAN nodes, are typically deployed to boost capacity rather than offering enhanced access performance, frequent SSB transmissions may be redundant and a waste of the small/micro node's capacity and thus may lead to an unnecessary increase in power consumption by the small RAN node. According to embodiments disclosed herein, a macro RAN node may dynamically facilitate providing, to user equipment, secondary access information corresponding to one or more available micro RAN nodes, one or more of which may have deactivated broadcasting of power-consuming and capacity-inefficient SSB signals without introducing severe device access and timing synchronization problems.

Synchronization signal blocks signals are conventionally the sole 'always-on' signal transmissions of 5G new radio systems, wherein SSB signals are broadcast by a RAN node regardless of user equipment presence or energy consumption conditions corresponding to the RAN. An SSB may be used by idle mode user equipment devices to determine received coverage levels corresponding to nearby RAN nodes and to facilitate the user equipment performing cell selection or re-selection while the user equipment is in an idle mode, an inactive mode, or a standby mode. An SSB signal may comprise multiple information elements that facilitate user equipment determining an identifier corresponding to the SSB-transmitting node as well as the node's basic radio configurations, for example synchronization timing information (e.g., downlink timing synchronization). However, with respect to heterogeneous network deployments, wherein a macro cell node may be complemented by cooperating with micro nodes corresponding to geographic coverage areas that lie within a coverage area corresponding to the macro node to boost capacity within certain coverage sub-areas, regular and periodic SSB transmission by the micro nodes may cause a degradation of capacity to deliver traffic flow payload. Furthermore, regular and periodic SSB transmission by a micro node uses a substantial amount of energy. Since a micro node may be deployed for purposes of extending/expanding uplink or downlink capacity rather than facilitating a user equipment in accessing a radio access network, SSB transmission by the micro node may be unnecessary and thus wasteful of capacity and energy.

Due to the many signals that may be part of transmission of SSB signals and the periodic and 'always-on' nature of SSB transmission, transmission of SSB signals tends to be a power-hungry and signaling-heavy operation. It is desirable to minimize energy used for transmission of SSB signals. To conserve energy consumption at a micro cell radio network node, a node may deactivate transmission of SSB signals for a period.

However, without small/micro radio network nodes transmitting frequent SSB signals, user equipment operating in idle mode that are in proximity of the node may not detect the node and thus, using conventional techniques, user equipment may not be able to maintain timing synchronization with the node or may not be able to access the node. Embodiments disclosed herein may make use of the fact that timing and access configuration corresponding to a radio network node associated with a macro cell and corresponding to a radio network node associated to a micro cell, which micro node may have a coverage zone that falls within a coverage zone of the macro cell, are typically similar due to the micro cell providing coverage that lies within a larger coverage area corresponding to the macro cell.

According to embodiments disclosed herein, a capacity-boosting micro/small cell radio network node can be accessed by idle mode devices (and the user equipment can be time-synchronized with the micro node) without the need for frequent transmissions of SSB signals by the micro cell radio network node. According to some embodiments disclosed herein, access and timing configurations (and generally access performance) with respect to a macro cell may function as a reference with respect to accessing of one or more available small cells having coverage within a coverage corresponding to the macro cell. A reference cell/radio network node (e.g., a macro cell node) may proactively provide differential access and timing information (e.g., timing advance difference, downlink timing synchronization difference, or received coverage level/signal strength differences) with respect to one or more radio network nodes corresponding to one or more potential target small/micro cells corresponding to coverage zones that lie within a coverage zone corresponding to the macro cell. Thus, user equipment devices can smoothly transition (select/re-select) from a macro cell to one or more small/micro cells without one or more nodes corresponding to the one or more micro cells broadcasting power-consuming and capacity-inefficient SSB signal information needed by user equipment to access the micro cell node(s).

According to embodiments disclosed herein, nodes corresponding to macro cells and micro cells may periodically, or occasionally, exchange zone-coverage access information corresponding to one or more of the nodes. A macro radio network node may adaptively determine and broadcast a differential access configuration corresponding to a coverage zone associated with a target small/micro cell.

On Demand Cell Access Assistance.

In an embodiment, a macro/primary/reference RAN node 105 may receive from one or more secondary micro RAN nodes 205, via backhaul interfaces/links 120, an access performance map 225 (described in more detail in reference to FIG. 5). Performance map 225 may comprise information elements with information corresponding to one or more different secondary micro RAN nodes that may be potential target nodes by a user equipment during a period when the micro node(s) has/have deactivated broadcasting of SSB signals. For a coverage zone, or coverage zone identifier corresponding to the one or more secondary micro RAN node(s), information elements included in access performance map 225 may comprise, or may be indicative of: one or more timing advance value corresponding to the respective one or more micro node(s), or one or more received coverage level value, which may correspond to one or more signal strength values corresponding to one or more signals received from the one or more micro nodes and determined by one or more user equipment located in one or more geographic coverage zone(s) associated with the one or more micro RAN node(s). The radio access performance indications indicated by an access performance map may be determined by a secondary micro RAN node, based on real-time or statistical user equipment access performance (e.g., based on radio parameter measurement reports comprising measured timing advance and signal strength values determined by one or more user equipment) and can be averaged or filtered before being reported to the master/reference/macro RAN node via an access performance map 225.

As an example, a micro node 205 may average measured TA values received from one or more user equipment located within a geographic coverage zone 210 corresponding to the micro node (e.g., a coverage zone may be an area having a size or shape that corresponds to expected signal strength of a micro node based on, for example, transmitter output power of the node, receiver sensitivity of the node, or antenna configuration or orientation of the node) and report an average of the TA values toward a macro RAN node corresponding to a coverage area within which a coverage area corresponding to the micro node lies. In an embodiment, a macro/reference RAN node may receive, from equipment corresponding to core network 130, via backhaul interface links 120, an on-demand cell access configuration/message, which may be referred to as an access mode indication. An access mode indication message may comprise an indication of an access information broadcasting mode that may be, for example, a standalone broadcasting mode or a differential broadcasting mode. A standalone broadcasting mode may refer to, for example, a reference macro RAN node broadcasting explicit access information corresponding to one or more secondary micro RAN node(s). Explicit access information may refer to actual values usable by a user equipment to access a micro node corresponding to the explicit access information without performing a calculation with respect to access information corresponding to the macro node that transmitted the explicit access information. For example, explicit access information may comprise a timing advance value or a signal strength value corresponding to a signal transmitted by the micro node that a user equipment may use to access the micro node. A differential broadcasting mode may refer to a macro RAN node broadcasting differential access information that may be usable by a user equipment to access a micro RAN node wherein the user equipment may use the differential access information and access information corresponding to the macro node to calculate/determine explicit, or actual, access information, corresponding to the micro node, that the user equipment may then use to access the micro node. Differential access information may comprise offsets or adjustments that may be applied with respect to access information corresponding to a macro node to determine actual access information that is usable by user equipment to access a micro node corresponding to the differential access information. For example, an offset to an already-measured TA corresponding to a macro RAN node may be applied to the already-measured TA to determine access information usable to access a micro node corresponding to the offset. Use of differential access information may be beneficial to a user equipment device that has previously accessed a macro RAN node and has already determined basic access configuration with respect to the macro node). Thus, a user equipment may apply broadcast differential adjustment to access and to synchronize with an available micro node.

A macro RAN node may transmit or broadcast a reference cell indication, which may be referred to as a secondary access information indication, as part of a master information block ("MIB"). Secondary access information indication may be indicative to user equipment operating in an idle mode that access information, broadcast by the macro RAN node, may be directly usable (e.g., access information is explicit access information) or differentially applied to access information corresponding to the macro node to determine access information that is then usable to access a micro RAN node that is not transmitting SSB signals and thus is not otherwise detectable to user equipment operating in an idle mode, an inactive mode, or a standby mode.

On condition of adopting, or being configured to facilitate, standalone broadcasting of micro node secondary access information, a macro RAN node may transmit or broadcast secondary access information as part of an existing system information block ("SIB") or as part of a newly defined SIB. Secondary access information in a SIB may be indicated by, or 'pointed to' by, a secondary access information indication indicated in a MIB transmitted by the macro node. Secondary access information included in a SIB may comprise: one or more target RAN node identifiers corresponding to one or more micro nodes that may correspond to geographic coverage zones that lie within a coverage zone corresponding to the macro node that transmitted the SIB. Secondary access information included in a SIB may comprise identifiers corresponding to one or more coverage zone(s) corresponding to the identified one or more target micro node(s) and timing advance value(s) corresponding to the identified coverage zones that may be useable by user equipment located in one of the one or more coverage zones to facilitate accessing corresponding micro node. Secondary access information included in a SIB may comprise received coverage level value(s). Secondary access information included in a SIB may comprise downlink synchronization timing offset value(s) determined with respect to a reference macro RAN node.

On condition of adopting, or being configured to facilitate, differential broadcasting of secondary access information, a macro RAN node may calculate or determine differential secondary access information, or configuration(s), corresponding to one or more target secondary micro RAN node(s) for each coverage zone corresponding to the one or more micro nodes. Differential secondary access information may comprise difference values corresponding to one or more micro nodes with respect to access information associated with one or more radio parameters corresponding to the macro node, for example, a timing advance parameter value, a measured received coverage/signal strength parameter value, or a downlink synchronization timing parameter value. The differential secondary access information may be determined based on radio parameter access information corresponding to the macro node and radio parameter access information corresponding to one or more micro node indicated in one or more access performance map(s) received from the micro node(s).

A macro RAN node may transmit or broadcast differential secondary access information as part of an existing or new SIB. Differential secondary access information may comprise: one or more target micro RAN node identifiers; one or more timing advance value offset(s) corresponding to the one or more micro nodes; one or more received coverage level value offset(s) corresponding to the one or more micro nodes; or one or more downlink synchronization timing offset(s) corresponding to the one or more micro nodes. An offset for a radio parameter (e.g., timing advance, coverage level, synchronization timing) may be applied by a user equipment to a respective radio parameter measured by the user equipment corresponding to the macro node that transmitted the differential secondary access information in a SIB. Thus, according to embodiments disclosed herein, a micro RAN node, corresponding to a coverage zone that lies within a coverage zone corresponding to a macro node, may avoid frequent transmissions of capacity-inefficient and power-consuming SSB signals while still being accessible by user equipment access via facilitation by a macro RAN node that may be broadcasting access information corresponding to the micro node.

According to embodiments disclosed herein, a first RAN node may dynamically determine and broadcast access information to be usable by idle mode user equipment devices to access a second RAN node corresponding to a coverage zone that lies within, or that overlaps, a coverage zone corresponding to the first RAN node. According to conventional techniques, before connection establishment, a RAN node must receive a random access preamble from a user equipment device and measure a timing advance based on analysis of information corresponding to SSB signals. Even in controlled handover scenarios, according to conventional techniques, a source cell may indicate to a user equipment device a collision-free random access preamble usable to directly access a target node, wherein the receiving of the preamble and determining a timing advance must be executed in order. Instead, according to embodiments disclosed herein, novel RAN node behavior at a macro node facilitates broadcasting of access information, including timing information, corresponding to a micro node that is not broadcasting SSB signals, to be usable by user equipment establish a connection towards the micro node.

Figure 2:
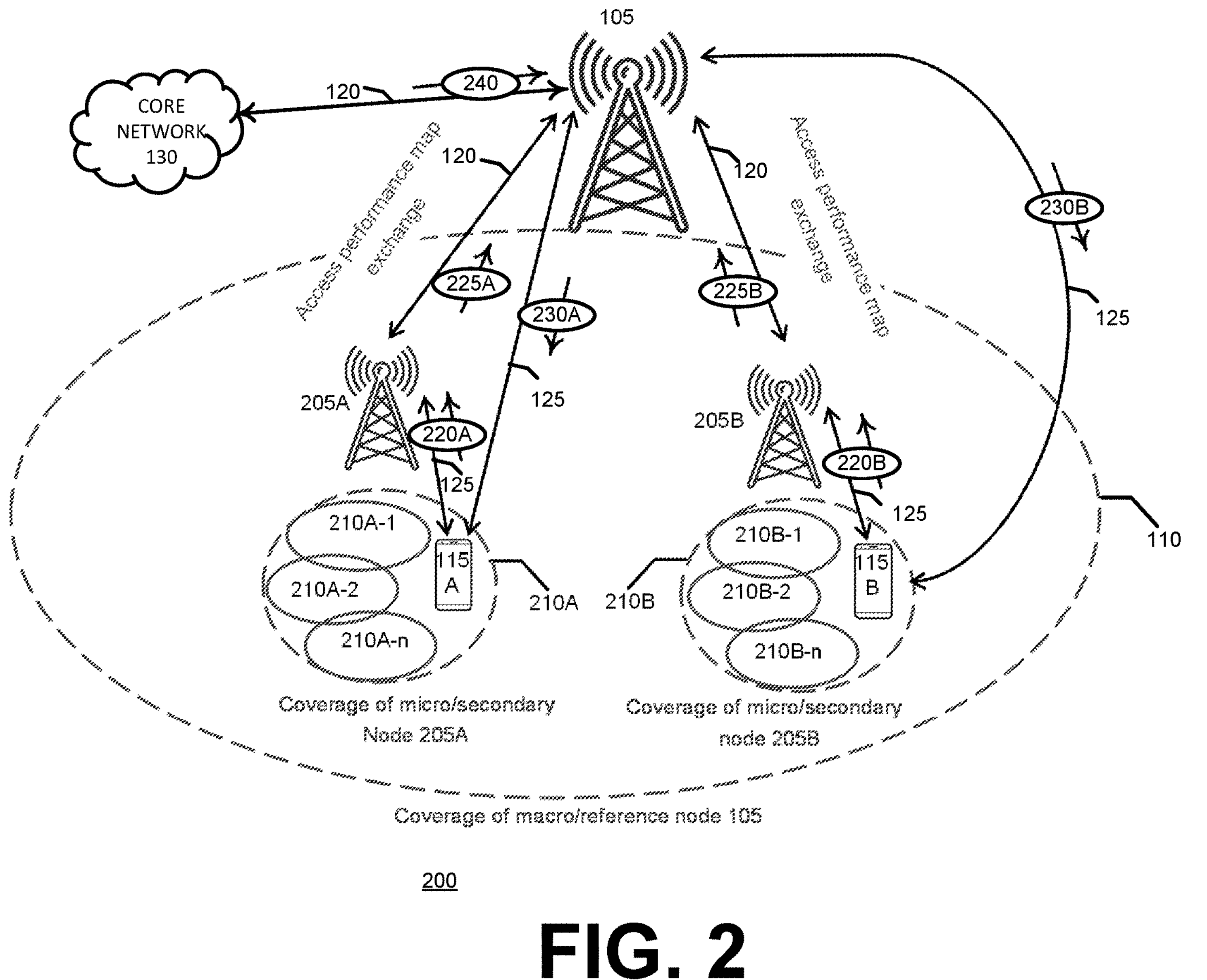
FIG. 2 illustrates an example environment with multiple micro radio network nodes deployed within a geographic coverage zone area corresponding to a macro radio network node.

FIG. 2 illustrates an example environment with multiple micro radio network nodes 205A and 205B deployed within a geographic coverage area 110 corresponding to macro radio network node 105. Such an environment comprising macro node 105 corresponding to coverage zone 110 and one or more micro nodes 205, corresponding to respective micro node zone(s) 210 that lie within zone 110, may be referred to as a heterogeneous network. Primary/reference macro RAN node 105 may receive, from each of one or more secondary micro RAN nodes 205A and 205B, via backhaul interface links 120, access performance maps 225A and 225B, respectively. As shown in FIG. 5, an access performance map 225 may comprise one or more coverage zone identifiers 510A-510*n*, corresponding to one or more coverage zones 0-N, which may be predetermined, or predefined, corresponding to a micro RAN node 205 from which performance map 225 is received. Coverage zones 0-N shown in FIG. 5 may correspond to zones 210A, 210A-1, 210A-2, or . . . 210A-n shown in FIG. 2.

In association with each zone identifier 510, performance map 225 may comprise: one or more timing advance value(s) 515A-515*n* corresponding to the respective associated zone; one or more received coverage value(s) 520A-520*n* corresponding to the respective associated zone; or one or more downlink synchronization offset value(s) 525A-525*n* corresponding to the respective associated zone. Each radio access parameter performance indicator (e.g., indications in map 225 indicative of radio parameters: timing advance values, coverall level values, or synchronization offset values) may be determined by each secondary micro RAN node 205A or 205B, based on real-time or statistical device access performance parameter values, which may be transmitted by one or more user equipment 115A or 115B to respective micro nodes 205A or 205B via one or more radio parameter measurement report(s) 220. Information conveyed by one or more radio parameter measurement reports 220 may be averaged or filtered by a micro RAN node 205 before reporting to master/reference macro RAN node 105. For example, micro RAN node 205A may average statistical samples of measured TA values received from multiple user equipment 115 that may be located within zone 210A (e.g., only UE 115A is shown in zone 210A for clarity, but it will be appreciated that more than just UE 115A may be located within zone 210A), or subzones thereof (e.g., zones 210A-1, 210A-2, . . . 210A-n), and may report, via access performance map 225, one or more averaged timing advance values corresponding to zone(s) 210A, 210A-1, 210A-2, or . . . 210A-n. Macro/reference RAN node 105 may receive, from core network 130 via backhaul interface links 120, access mode indication 240 indicative of a standalone broadcasting mode or a differential broadcasting mode. Secondary access information 230A or 230B may be transmitted, via wireless links 125 in a SIB signal message, according to a mode indicated by access mode indication 240.

Figure 3:
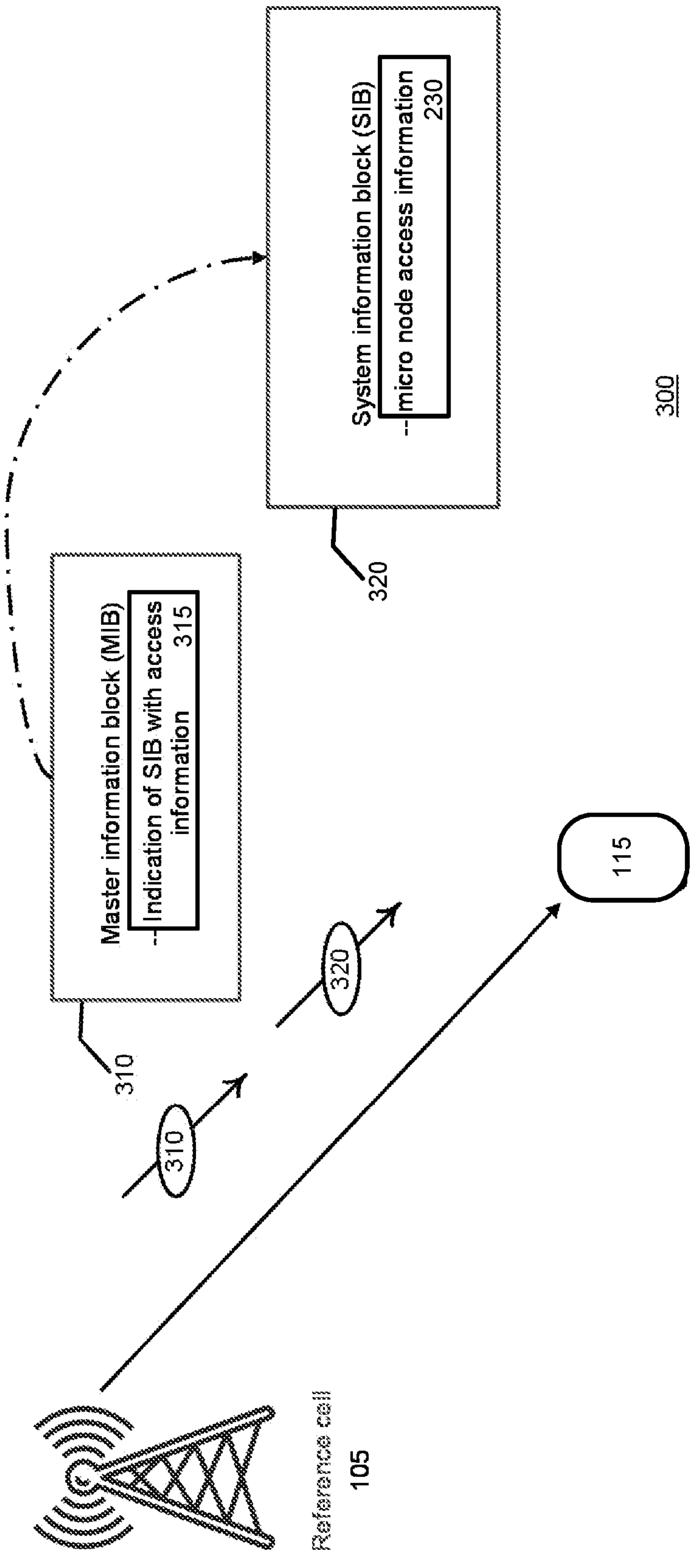
FIG. 3 illustrates an environment with a macro radio network node broadcasting a master information block signal comprising a master information block secondary access information indication and broadcasting a system information block signal comprising secondary access information corresponding to a micro radio network node.

FIG. 3 illustrates an environment 300 wherein a macro radio network node 105 broadcasts a master information block 310 comprising a master information block secondary access information indication 315, which indicates, refers to, or otherwise points to secondary access information 230. Node 105 may broadcast secondary access information 230 via system information block 320. Secondary access information 230 may correspond to a micro radio network node, such as node 205A or 205B described in reference to FIG. 2. A user equipment operating in an idle mode may receive MIB 310 from RAN node 105 and determine to decode secondary access information 230 that may be indicated by indication 315 contained in MIB 310. Secondary access information 230 may be explicit access information or differential access information usable by user equipment 115 to access a micro node indicated by the secondary access information (e.g., if explicit access information), or to determine access configuration information (e.g., if differential access information) usable by UE 115 to access a micro node, that is not transmitting SSB signals.

Figure 6:
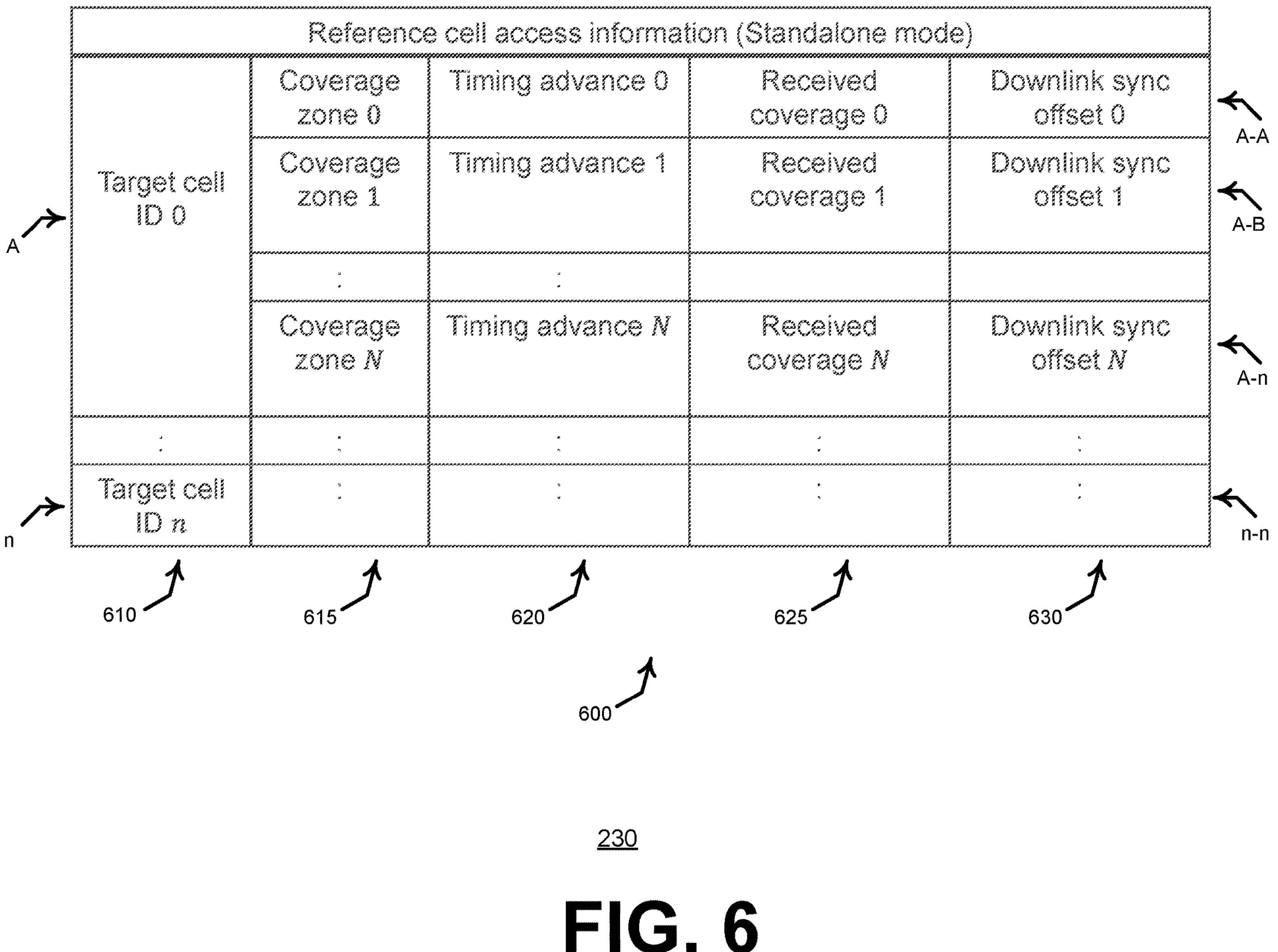
FIG. 6 illustrates example explicit access information corresponding to a micro radio network node.

On condition of macro RAN node 105 being configured to facilitate standalone broadcasting of secondary access information 230, a SIB 320 may comprise explicit access information as shown in example explicit information 600 shown in FIG. 6. The macro RAN node may transmit or broadcast explicit secondary access information that may comprise one or more target micro RAN node identifiers 610A . . . 610*n* corresponding to one or more micro nodes associated with one or more coverage zones that may lie within, or overlap a coverage zone corresponding to the macro node. Explicit information 600 may comprise one or more coverage zone identifiers 615A-A . . . 615*n-n* corresponding to one or more micro node identifiers 610A . . . 610*n*. Information 600 may comprise one or more timing advance values 620A-A . . . 620*n-n* respectively associated with zones 615A-A . . . 615*n-n*. Explicit access information 600 may comprise one or more received coverage values 625A-A . . . 625*n-n* respectively associated with zones 615A-A . . . 615*n-n*. Explicit access information 600 may comprise one or more downlink synchronization offset values 630A-A . . . 630*n-n* respectively associated with zones 615A-A . . . 615*n-n*. Information 600 may be referred to as explicit access information because the information contained in SIB 320, shown in FIG. 3, may be used to access a target micro RAN node without further calculation with respect to access information corresponding to the macro RAN node.

On condition of macro RAN node 105 being configured to implement differential broadcasting of reference cell access information, the macro RAN node may calculate and determine differential secondary access information corresponding to one or more micro RAN node(s) overage zone(s) in terms of difference values related to measured timing advance values, measured received coverage, and measured downlink synchronization timing between the macro RAN and one or more micro RAN nodes corresponding to micro RAN node identifiers 710A . . . 710*n* shown in FIG. 7. Difference values may be determined based on information contained in an39ccesss performance map 225 as described in reference to FIG. 5. A macro RAN node may transmit or broadcast secondary access information 230 as differential secondary access information, an example of which is shown as information 700 in FIG. 7, as part of an existing SIB or a new SIB. Differential access information 700 may comprise one or more target micro RAN node identifiers 710A . . . 710*n* corresponding to one or more micro nodes associated with one or more coverage zones that may lie within, or overlap, a coverage zone corresponding to the macro node that transmits a SIB that contains, or that indicates, information 700. Information 700 may comprise one or more coverage zone identifiers 715A-A . . . 715*n-n* corresponding to one or more micro node identifiers 710A . . . 710*n*. Information 700 may comprise one or more timing advance difference offset values 720A-A . . . 720*n-n* respectively associated with zones 715A-A . . . 715*n-n*. Differential access information 700 may comprise one or more received coverage offset values 725A-A . . . 725*n-n* respectively associated with zones 715A-A . . . 715*n-n*. Differential access information 700 may comprise one or more downlink synchronization offset values 730A-A . . . 730*n-n*, respectively associated with zones 715A-A . . . 715*n-n*, that may be applied to one or more offset values with respect to one or more downlink synchronization offset value(s) corresponding to a macro RAN node that transmitted a SIB that may contain, or that may point to, differential information 700. Information 700 may be referred to as differential access information because differential information 230 contained in SIB 320, shown in FIG. 3, may be used to determine, by a user equipment, secondary access information that may then be used to access a target micro RAN node.

Device-Assisted Inter-Cell Downlink Synchronization.

According to conventional techniques, user equipment not camping on a particular RAN node do not decode SIB messages broadcast by the particular RAN node. According to embodiments disclosed herein, user equipment not camping on a first node that is broadcasting differential access information with respect to a second node, may read and attempt decoding special configuration information broadcast by the first node upon determining that the first node is acting as a reference node with respect to the second node that is not broadcasting SSB signals. According to embodiments disclosed herein, user equipment may determine and report to a first/macro node difference downlink synchronization timing offset information corresponding to a second/micro node with respect to the first/macro node.

Figure 4:
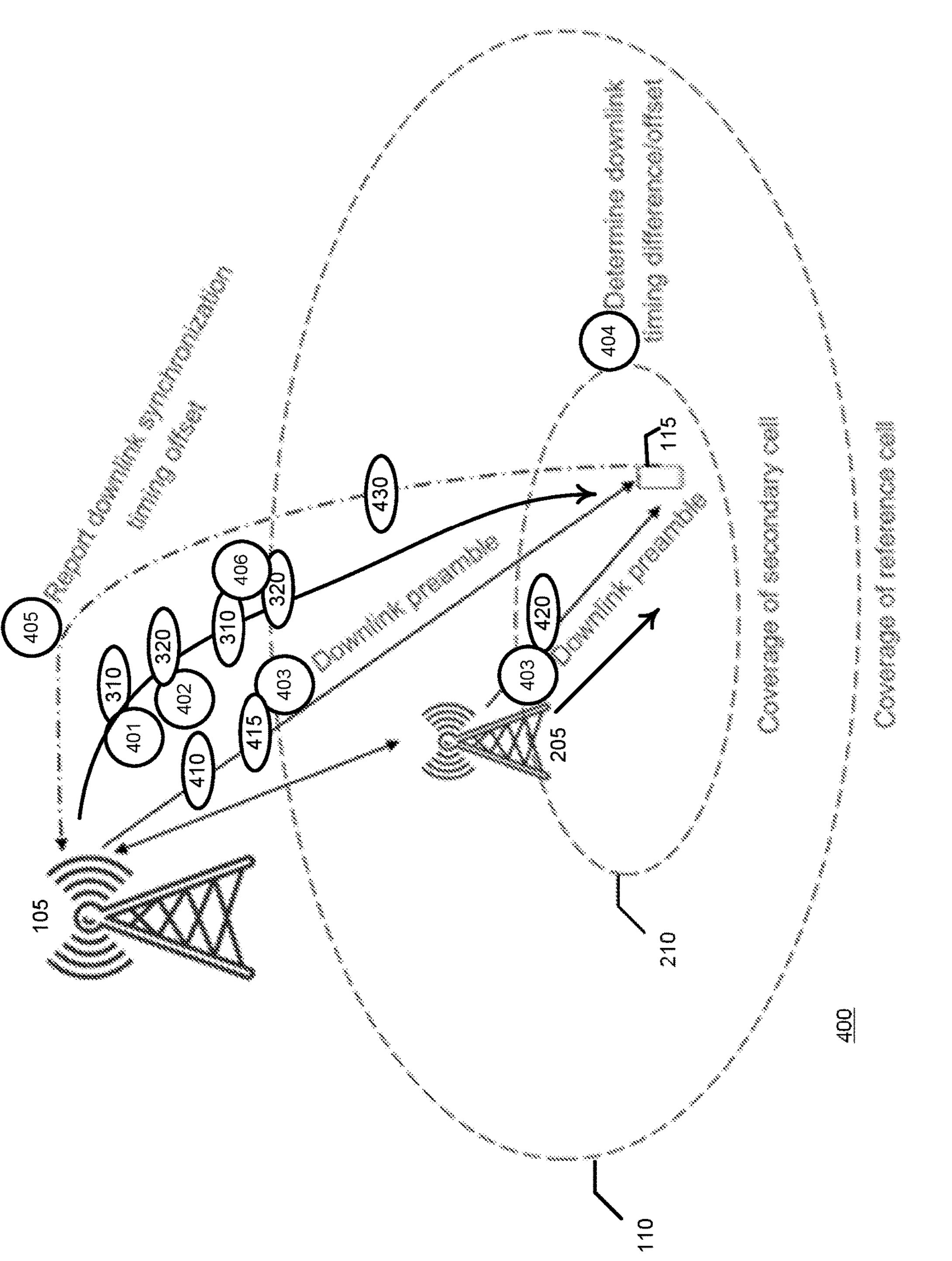
FIG. 4 illustrates an example environment with a user equipment determining and transmitting to a macro radio network node differential access information corresponding to a micro radio network node.

Turning now to FIG. 4, the figure illustrates an example environment 400 with a user equipment 115 determining and transmitting to macro radio network node 105 differential access information corresponding to micro radio network node 205. According to the embodiment shown in FIG. 4, the larger-coverage macro RAN node 105 may dynamically determine and proactively broadcast differential access and timing information to be used by UE 115 to access, and synchronize timing with respect to, micro node 205, without the UE attempting random access with the micro node. Thus, micro node 205 may avoid broadcasting SSB signals, at least for extended periods to result in substantial energy savings compared to energy used if the micro node were to be 'always-on' with respect to transmission of SSB signals.

UE 115 may detect reference macro node 105 that may be facilitating offering of differential access and timing information on behalf of micro node 205. UE 115 may obtain secondary access information usable to access and synchronize with micro node 205 without performing random-access with the micro node. To facilitate reference macro node 105 determining to broadcast, and broadcasting differential secondary access information, for example differential secondary access information 700 described in reference to FIG. 7 that may comprise timing information with respect to the downlink direction that may only be available to UE 115, the user equipment, operating in an idle mode, may be configured to dynamically calculate one or more downlink synchronization difference(s) between macro RAN 105 and each of one or more micro nodes, such as, for example node 205 shown in FIG. 4. UE 115 may be configured to report, while not operating in an idle mode, a downlink synchronization timing difference to macro node 105 RAN node, which downlink synchronization difference information may be usable by idle user equipment devices, perhaps by user equipment other than UE 115 located within coverage zone 210 corresponding to micro node 205. Accordingly, user equipment located in coverage zone 210 may be configured, via, for example, differential access information 700 described in reference to FIG. 7, to determine secondary access information corresponding to micro nodes, for example node 205 shown in FIG. 4, that have deactivated transmission of SSB signals, based on previous instants of user equipment assessing access information of micro node 205 with respect to macro node 105 during a period that the micro node has not deactivated transmission of SSB signals.

At act 401, UE 115 may receive and decode MIB 310 broadcast by macro node 105. At act 402, on determining that MIB 310 contains a secondary access information indication 315, UE 115 may receive and decode SIB 320, indicated by indication 315, which may be carrying secondary access information, such as secondary access information 230 described in reference to FIG. 6 or FIG. 7. UE 115 may receive and decode SIB 320 at act 402, despite not attempting to establish or access macro node 105, based on the UE being made aware, via indication 315, of SIB 320 that may be carrying access information usable to access micro node 205 that may not be broadcasting SSB signals. Decoding of SIB 320 at act 402 may be specific to a group of user equipment (e.g., SIB 320 may be multicast) or may be performed by all idle mode user equipment devices that may detect MIB 310 (e.g., SIB 320 may be broadcast).

On condition of receiving a downlink synchronization timing estimation request 410 from macro RAN node 105, at act 403 WTRU/UE 115 may receive and measure a first available synchronization signal block signal 415 and a first available synchronization signal block signal 420 that may include preambles and that may be respectively broadcast by reference macro node 105 and one or more target micro RAN node(s) indicated in request 410. At act 404, WTRU/UE 115 may calculate or otherwise determine a received synchronization sequence timing difference value corresponding to a difference in times of receiving signals 415 and 420. At act 405, WTRU/UE 115 may transmit, toward reference macro RAN node 105, a synchronization difference timing report 430, which may facilitate reference macro RAN node 105 becoming aware of one or more downlink synchronization timing differences, determined by UE 115, between receiving from node 105 signal 415 and receiving one or more signals 420 from one or more micro nodes 205. It will be appreciated that micro nodes 205 may activate transmitting of SSB signals during a deactivated energy saving mode period, during which one or more micro nodes may actively transmit SSB signals, and micro nodes may deactivate transmission of SSB signals during an activated energy saving mode period. Thus, micro node 205 may transmit SSB signal 420 during a deactivated energy saving mode period.

Macro RAN node 105 may broadcast downlink timing difference information to idle mode devices, including devices other than UE 115 shown in FIG. 4, to be used by the user equipment to determine how to synchronize their timing clocks with respect to a micro node during an activated energy saving mode period without actually decoding SSB signals transmitted by the micro nodes, thus facilitating the micro nodes implementing an activated energy saving mode period during which the micro nodes may refrain from transmission of power-consuming SSB signals.

On condition of WTRU/UE 115 camping on or establishing a connection toward a target micro RAN node (e.g., node 205) identified by secondary access information 230 contained in, or indicated by, a SIB 320 transmitted by macro RAN node 105 at act 406, the WTRU/UE may determine a coverage zone corresponding to micro RAN node 205 (e.g., coverage zone 210), select or calculate and adopt a TA, associated in secondary access information 230, with the determined coverage zone 210, and may fine-tune a timing clock corresponding to the user equipment according to the determined/received downlink synchronization timing difference indicated by secondary access information 230 as corresponding to the determined coverage zone 210. WTRU/UE 115 may avoid transmitting of an uplink preamble to micro node 205 (e.g., UE 115 may skip random access with node 205) and may directly transmit an uplink connection establishing request using the TA associated with the micro node in the secondary access information received at act 406 to determined zone 210. Accordingly, UE 115 can access or camp on micro node 205, which corresponds to coverage zone 210 that lies with zone 110 of previously accessed reference macro cell 105, without actually attempting random access with micro node 205 or without micro node 205 transmitting energy-consuming and capacity-inefficient SSB signals.

Figure 8:
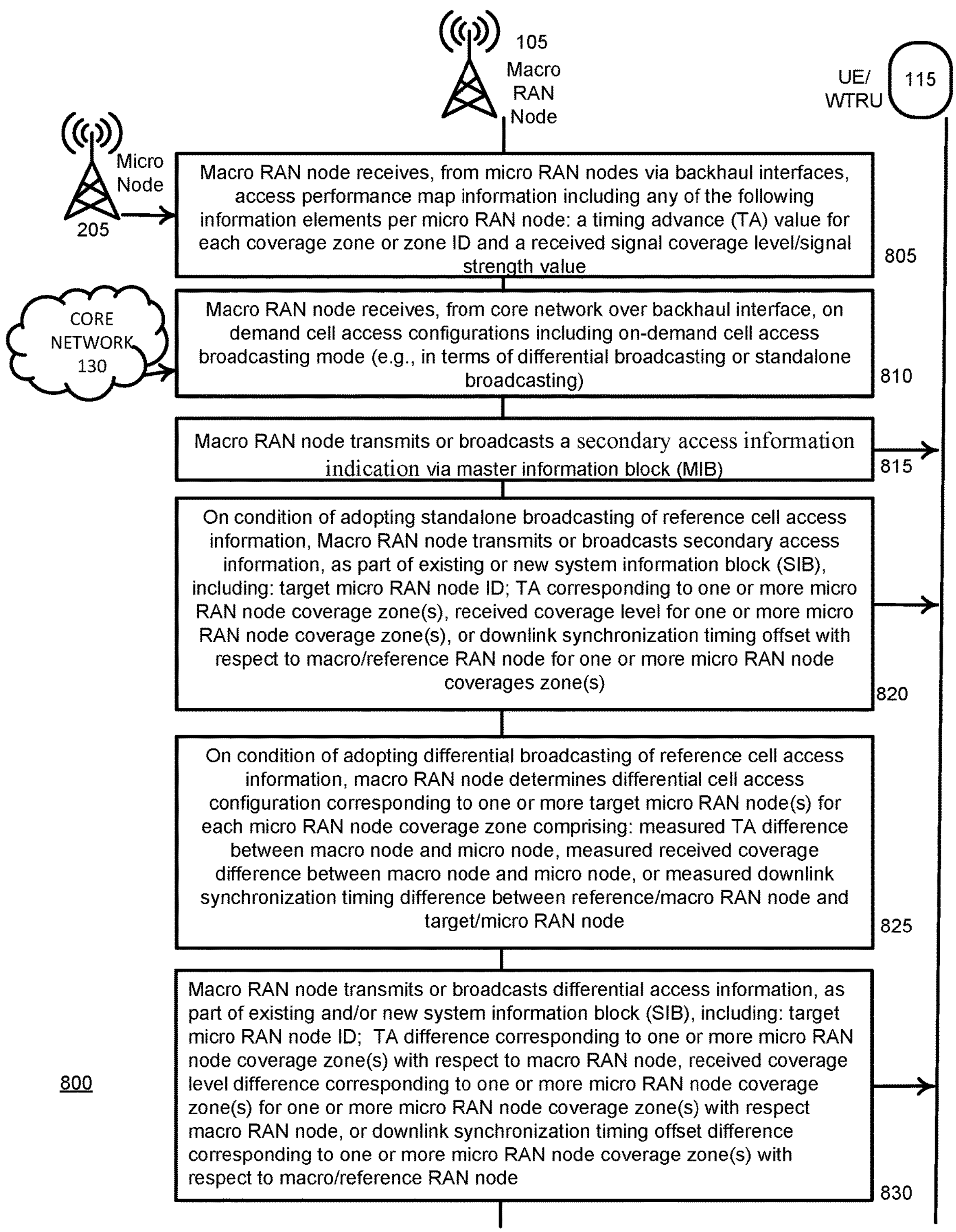
FIG. 8 illustrates a timing diagram of an example method of a macro radio node facilitating a user equipment accessing, or connecting to, a micro radio node that is operating in an energy saving mode.

Turning now to FIG. 8, the figure illustrates a timing diagram of an example method 800. At act 805, macro RAN node 105 may receive from one or more adjacent micro RAN nodes 205 (e.g., micro RAN nodes that respectively correspond to one or more coverage zones that lie within, or overlap with, a coverage zone corresponding to RAN node 105) via backhaul interface links, an access performance map message comprising an access performance map. An access performance map may comprise one or more of the following information elements: for each coverage zone or zone ID corresponding to a micro RAN node, a timing advance value or a received coverage/signal strength value. At act 810, RAN node 105 may receive from core network 130 via backhaul interface links, an on-demand cell access configuration, which may be referred to as an access mode indication and which may comprise a secondary access information broadcasting mode that may be indicative of either a differential broadcasting mode or a standalone broadcasting mode.

At act 815, RAN node 105 may transmit or broadcast a reference cell indication, which may be referred to as a master information block secondary access information indication, as part of a master information block.

On condition of the access mode indication received at act 810 being indicative of a standalone broadcasting mode, at act 820 RAN node 105 may transmit or broadcast secondary access information, as part of an existing SIB or as part of a new SIB. The SIB indicated by the MIB secondary access information indication may comprise: a target RAN node identifier corresponding to micro node 205; for one or more coverage zones associated with micro node 205, one or more corresponding timing advance values; for the one or more coverage zones associated with micro node 205, one or more corresponding received coverage level/signal strength values; or for the one or more coverage zones associated with micro node 205, one or more corresponding downlink synchronization timing offset values indicative of downlink timing offsets corresponding to micro RAN node 205 with respect to macro node 105.

On condition of the access mode indication received at act 810 being indicative of a differential mode for broadcasting of secondary access information, RAN node 105 may calculate or determine differential secondary access information corresponding to one or more coverage zones corresponding to micro RAN node 205. Differential secondary access information for each coverage zone may comprise a difference in measured parameters values corresponding to micro node 205 and micro node 105 for parameters including: timing advance, measured received coverage, and measured downlink synchronization timing. At act 830, macro RAN node 105 may transmit or broadcast differential secondary access information, as part of an existing SIB or as part of a new SIB, including: one or more micro RAN node identifiers corresponding to one or more micro RAN nodes, for example node 205, corresponding to coverage zones lying within, or overlapping with, a coverage zone corresponding to macro RAN 105; for one or more of the coverage zones, associated with coverage zone identifiers, one or more corresponding timing advance difference offset values; for one or more of the coverage zones, one or more received coverage level offset values; or for one or more of the coverage zones, one or more downlink synchronization timing offset values; wherein the offset values are parameter values corresponding to micro node 205 with respect to the same parameters values corresponding to macro node 105. It will be appreciated that the difference values may be based on measured parameter values determined by one or more user equipment during a period that node 205 has deactivated an energy saving mode.

Figure 9:
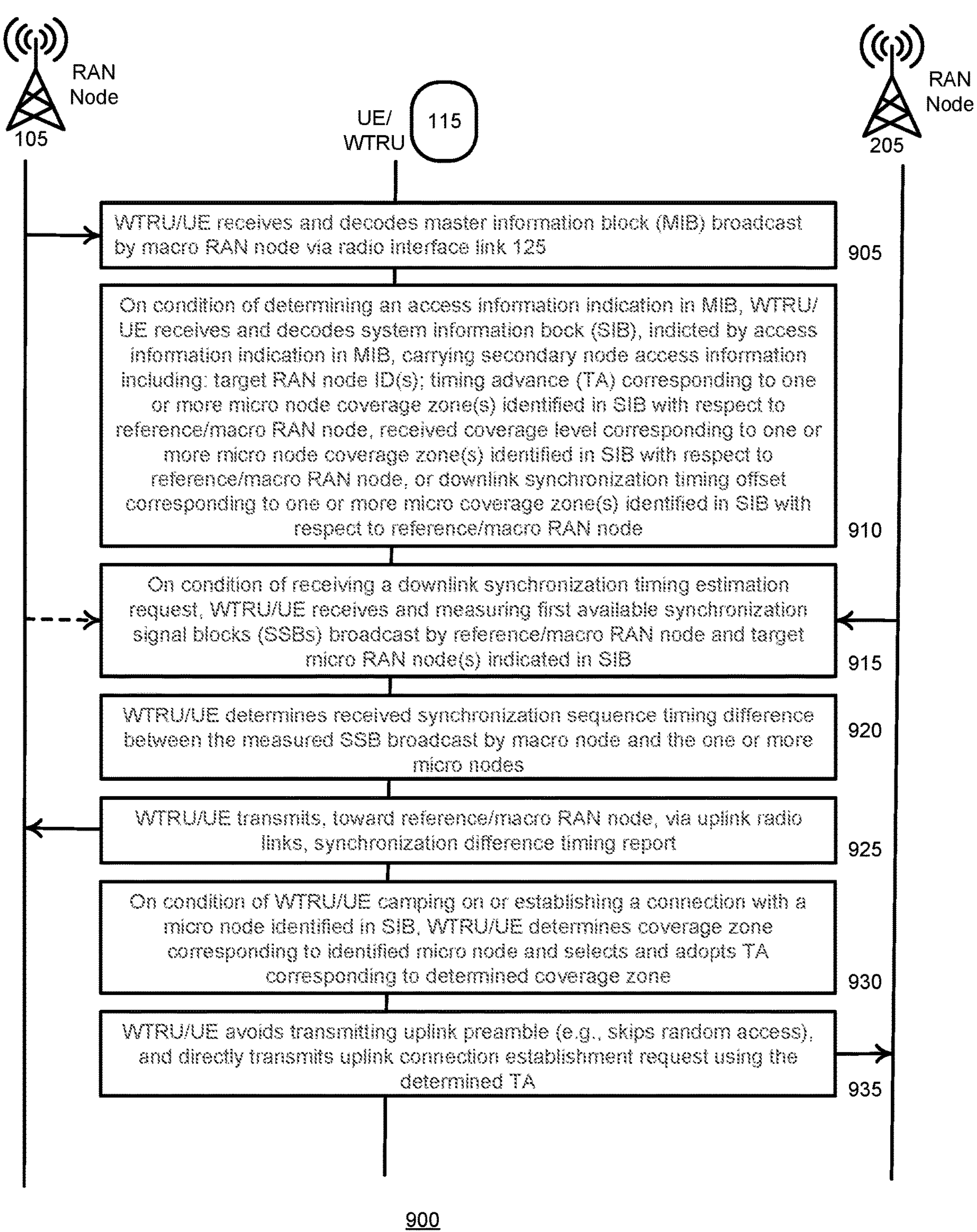
FIG. 9 illustrates a timing diagram of an example method of a user equipment determining and transmitting differential access information usable to access, or connect to, a micro radio node that is operating in an energy saving mode.

Turning now to FIG. 9, the figure illustrates a timing diagram of a method 900. At act 905, WTRU/UE 115 may receive a master information block, broadcast by macro RAN node 105 via a radio interface link, and decode the master information block. On condition of UE 115 determining that the master information block comprises a master information block secondary access information indication indicative of secondary access information, corresponding to micro radio network node 205 and usable by the user equipment to access the micro radio network node, at act 910 WTRUUE/115 may receive and decode a system information bock, indicated by the master information block secondary access information indication. The SIB decoded at act 90 may be carrying inter-cell access information (e.g., secondary access information) and may include: a target RAN node identifier corresponding to micro node 205; one or more coverage zones corresponding to node 205 and indicated in the secondary access information, one or more respective timing advance values associated with coverage zones corresponding to the micro node, one or more received coverage level/signal strength values corresponding to the one or more coverage zones; or one or more downlink synchronization timing offset values, that are associated with the one or more coverage zones and that may correspond to micro node 205 with respect to node 105.

In an embodiment, at act 915, on condition of UE 115 receiving a downlink synchronization timing estimation request (indicated by a dashed line), WTRU/UE 115 may receive and measure parameter values corresponding to first available (e.g., first detected by UE 115) synchronization signals corresponding to both the macro RAN node 105 and one or more micro nodes 205 indicated by the downlink synchronization timing estimation request. It will be appreciated that node 205 may transmit the downlink synchronization timing estimation request to UE 115 during a period that an energy saving mode has been deactivated at micro node 205.

At act 920, WTRU/UE 115 may calculate and determine a received synchronization sequence timing difference between the measured SSBs corresponding to reference macro RAN node 105 and each of one or more target micro RAN nodes indicated in the downlink synchronization timing estimation request. At act 925, WTRU/UE 115 may transmit, toward reference macro RAN node 105, via an uplink radio interface link, a synchronization difference timing report comprising difference values determined at act 920. On condition of WTRU/UE 115 camping on or establishing a connection with micro node 205, WTRU/UE 115 may determine, at act 930, a coverage zone corresponding to micro RAN node 205, and may select and adopt timing advance information (explicit or differential) corresponding to node 205 that is associated with the determined coverage zone. At act 935, WTRU/UE may skip transmitting of an uplink preamble to micro RAN node 205 (e.g., idle UE 115 may skip random access with node 205), and may directly transmit an uplink connection establishment request to node 205 using timing advance information, and other secondary access information corresponding to node 205, that may have been transmitted by node 105 in a SIB indicated by a MIB also transmitted by node 105.

Turning now to FIG. 10, the figure illustrates a flow diagram of an example method 1000. Method 1000 begins at act 1005. At act 1010, a user equipment may measure one or more radio parameters, for example a timing advance value, a coverage level/signal strength value, or a downlink synchronization offset, with respect to a micro radio access node that corresponds to a coverage zone that lies within a coverage zone corresponding to a macro radio access node. At act 1015, the user equipment may determine whether a downlink synchronization timing estimation request message has been received from the macro radio access network node. If a determination is made at act 1015 that the user equipment received a downlink synchronization timing estimation request message from the macro radio access node, at act 1020 the user equipment may determine one or more radio parameter difference values corresponding to one or more radio parameters that may include a downlink synchronization timing difference value. Downlink synchronization timing difference value may be determined by the user equipment based on an SSB signal received from the macro radio access network node and the micro radio access node substantially simultaneously, which may occur within one SSB broadcast cycle period corresponding to the macro node or the micro node. It will be appreciated that the micro radio access network node may be operating during a period when an energy saving mode with respect to the micro radio access network node has been deactivated such that the micro radio access network node is actively transmitting SSB signals. At act 1025, the user equipment may transmit to the macro radio access network node a synchronization timing report/indication indicative of the downlink synchronization timing value corresponding to a difference in time between transmission, by the micro radio access network node, and receiving, by the user equipment, of an SSB signal transmitted by the micro radio access network node with respect to a time between transmission, by the macro radio access network node, and receiving, by the user equipment, of an SSB signal transmitted by the macro radio access network node. After transmitting the synchronization timing report/indication to the macro radio access network node, method 1000 may return to act 1010.

Returning to description of act 1015, if the user equipment determines that a downlink synchronization timing estimation request has not been received from the macro radio access network node, method 1000 may advance to act 1030. At act 1030, the user equipment may transmit a radio parameter measurement report to the micro radio access network node. The radio parameter measurement report transmitted at act 1030 may comprise a timing advance value corresponding to the micro radio access network node, a received signal coverage level/signal strength corresponding to the micro radio access network node, or a downlink timing synchronization value corresponding to the micro radio access network node. It will be appreciated that performance at act 1030 by the user equipment may be performed during a period when the energy saving mode has not been activated at the micro radio access network node. It will also be appreciated that more than one user equipment located within one or more coverage zones corresponding to the micro radio access network node may transmit one or more radio parameter measurement reports to the micro radio access network node during the period when the energy saving mode is not active at the micro radio access network node. At act 1035, based on one or more radio parameter measurement reports received from one or more user equipment during a period when an energy saving mode is not active at the micro radio access network node, the micro radio access network node may generate an access performance map, which may comprise one or more timing advance values, corresponding to one or more coverage zones associated with the micro radio access network node and associated in the map with one or more coverage zone identifiers corresponding to the one or more coverage zones associated with the micro radio access network node period. The access performance map may also comprise one or more coverage level value(s)/signal strength value(s) and one or more downlink synchronization timing offset value(s) corresponding to the one or more coverage zones associated with the micro radio access network node. At act 1040, the micro radio access network node may transmit to the macro radio access network node the access performance map generated at act 1035.

At act 1045, the micro radio access network node may activate an energy saving mode during an activated energy saving mode period during which the micro radio access network node may refrain from transmitting SSB signals. As an example, during a twenty-four hour period, the micro radio access network node may deactivate an energy saving mode for five hours and transmit SSB signals, which may be used, for example, by a user equipment at act 1010 to measure radio parameter metrics or by a user equipment at act 1030 to measure and transmit radio parameter metrics to the micro radio access network node. After transmitting SSB signals while an energy saving mode at the micro radio access network node is deactivated, the micro radio access network node may activate, or reactivate, an energy saving mode at act 1045 and avoid transmitting SSB signals to reduce power consumption.

A user equipment that may be operating in an idle mode, an inactive mode, or a standby mode may be located within a coverage zone corresponding to the micro radio access network node but may not detect SSB signals corresponding to the micro radio access network node because the micro radio access network node is avoiding transmitting SSB signals during an activated energy saving mode. However, at act 1050, the user equipment may detect an SSB signal broadcast by the macro radio access network node to which the access performance map generated at act 1035 was transmitted at act 1040. Based on receiving an SSB signal corresponding to the micro radio access network node at act 1050, the user equipment operating in an idle, an inactive mode, or a standby mode may receive and decode at act 1055 a MIB message signal which may comprise a secondary access information indication, for example indication 315 described in reference to FIG. 3. The MIB secondary access information indication, which may be represented by one or more bit(s), may indicate, identify, or otherwise point to a SIB that the macro radio access network node is configured to transmit. The SIB, for example SIB 320 described in reference to FIG. 3, indicated by the MIB secondary access information indication, may be an existing SIB, or may be a new SIB configured to convey secondary access information, for example secondary access information 230 described in reference to FIG. 3, usable by user equipment to access the micro radio access network node during an activated energy saving mode period at the micro radio access network node.

Continuing with description of FIG. 10, at act 1060 the user equipment operating in an idle mode, an inactive mode, or a standby mode may decode, from SIB 320, secondary access information 230, corresponding to the micro radio access network node, indicated by MIB secondary access information indication 315. At act 1065, the user equipment in idle mode, in active mode, or a standby mode may avoid performing random access procedures with the micro radio access network node, and at act 1070, the user equipment may access, or establish a connection with, the micro radio access network node based on the secondary access information decoded from the SIB at act 1060 while the micro radio access network node is avoiding transmission of SSB signals during an activated energy saving mode. Method 1000 advances to act 1075 and ends.

In an embodiment, secondary access information contained in a SIB that is decoded at 1060 may comprise explicit secondary access information that a user equipment may use to access the micro radio access network node without performing calculations with respect to radio performance metrics determined by the user equipment with respect to the macro radio access network node. In another embodiment, secondary access information contained in a SIB that is decoded at 1060 may comprise differential secondary access information that a user equipment may use to determine secondary access information that may be used to access the micro radio access network node by using the differential secondary access information to perform calculations with respect to radio performance metrics determined by the user equipment with respect to the macro radio access network node. The secondary access information conveyed in a SIB indicated in a MIB received at act 1055 may be either explicit secondary access information or differential secondary access information based on a configuration/indication received by the macro radio access network node from core network equipment.

Figure 11:
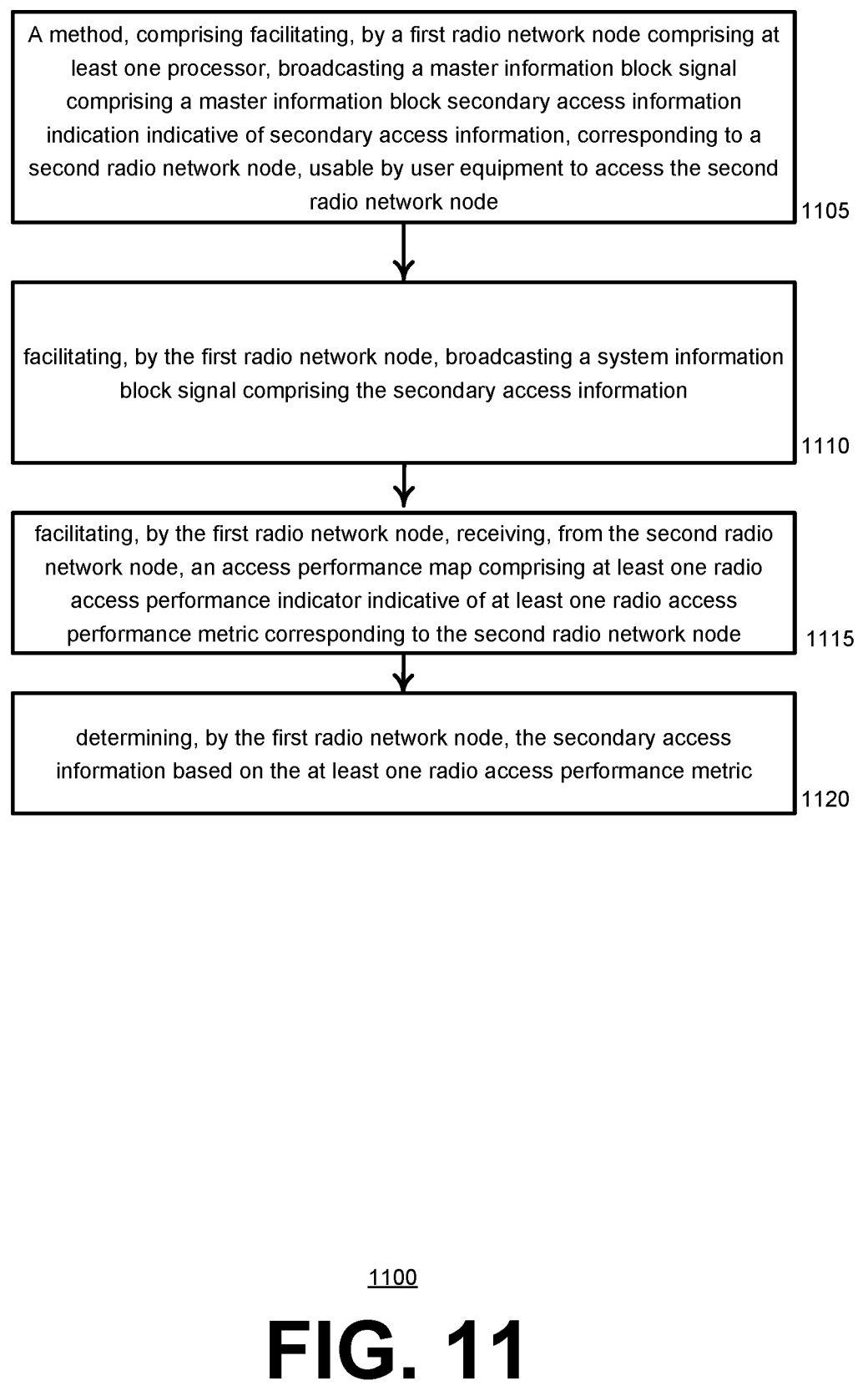

Turning now to FIG. 11, the figure illustrates an example embodiment method 1100 comprising at block 1105 facilitating, by a first radio network node comprising at least one processor, broadcasting a master information block signal comprising a master information block secondary access information indication indicative of secondary access information, corresponding to a second radio network node, usable by user equipment to access the second radio network node; at block 1110 facilitating, by the first radio network node, broadcasting a system information block signal comprising the secondary access information; at block 1115 facilitating, by the first radio network node, receiving, from the second radio network node, an access performance map comprising at least one radio access performance indicator indicative of at least one radio access performance metric corresponding to the second radio network node; and at block 1120 determining, by the first radio network node, the secondary access information based on the at least one radio access performance metric.

Turning now to FIG. 12, the figure illustrates a first radio network node 1200, comprising at block 1205 a processor configured to process executable instructions that, when executed by the processor, facilitate performance of operations, comprising receiving, from at least one user equipment, at least one radio parameter measurement report comprising at least one first radio access performance indicator indicative of at least one first radio access performance metric corresponding to the first radio network node; at block 1210 based on the at least one first radio access performance metric, generating at least one access performance map comprising at least one second radio access performance indicator corresponding to the at least one first radio access performance metric; at block 1215 transmitting, to a second radio network node, the at least one access performance map to be usable by the second radio network node to broadcast, in a system information block signal, access information usable by user equipment to access the first radio network node; at block 1220 activating an energy saving period to result in an activated energy saving period; at block 1225 avoiding transmission of a synchronization signal block signal during the activated energy saving period; and at block 1230 enabling a user equipment to establish communication access with respect to the first radio network node based on the access information being received by the user equipment from the second radio network node during the activated energy saving period and being used by the user equipment during the activated energy saving period to access the first radio network node.

Turning now to FIG. 13, the figure illustrates a non-transitory machine-readable medium 1300 comprising at block 1305 executable instructions that, when executed by at least one processor of a macro cell radio network node, facilitate performance of operations, comprising receiving, from network computing equipment communicatively coupled with the macro cell radio network node, an access mode indication indicative of an access information mode according to which the macro cell radio network node is to broadcast micro cell access information corresponding to a micro cell radio network node; at block 1310 receiving, from the micro cell radio network node, an access performance map comprising at least one aggregated radio access performance indicator, indicative of at least one aggregated radio access performance metric, corresponding to the micro cell radio network node; at block 1315 transmitting, to at least one user equipment, a master information block signal comprising a master information block micro cell access information indication indicative of the micro cell access information that is to be usable by the at least one user equipment to access the micro cell radio network node during an energy saving mode period, during which an energy saving mode is activated at the micro cell radio network node and during which the micro cell radio network node avoids broadcasting of synchronization block signals; at block 1320 transmitting, to the at least one user equipment, a system information block signal, comprising the micro cell access information, according to the access information mode; and at block 1325 wherein the at least one aggregated radio access performance metric is generated by the micro cell radio network node based on one or more individual radio performance metrics respectively determined by one or more user equipment, with respect to the micro cell radio network node, during a deactivated energy saving mode period during which the energy saving mode is inactive.

Turning now to FIG. 14, the figure illustrates an example embodiment method 1400 comprising at block 1405 receiving, by a user equipment comprising a processor from a first radio network node, a master information block signal comprising a master information block secondary access information indication indicative of secondary access information, corresponding to a second radio network node, usable by the user equipment to access the second radio network node; at block 1410 based on the master information block secondary access information indication being indicative of the secondary access information, receiving, from the first radio network node, a system information block signal comprising the secondary access information; at block 1415 based on the secondary access information, performing, by the user equipment with respect to the second radio network node, an access action during an activated energy saving mode period during which an energy saving mode is activated at the second radio network node; and at block 1420 wherein the performing of the access action comprises at least one of: selecting the second radio network node, reselecting the second radio network node, camping on the second radio network node, or establishing a connection with the second radio network node.

Turning now to FIG. 15, the figure illustrates an example user equipment 1500, comprising at block 1505, a processor configured to process executable instructions that, when executed by the processor, facilitate performance of operations, comprising receiving, from a macro cell radio network node, a master information block signal comprising a master information block secondary access information indication indicative of secondary access information, corresponding to at least one micro cell radio network node, usable by the user equipment to access the at least one micro cell radio network node; at block 1510 based on the master information block secondary access information indication being indicative of the secondary access information, receiving, from the macro cell radio network node, a system information block signal comprising the secondary access information; at block 1515 based on the secondary access information, performing, by the user equipment with respect to the at least one micro cell radio network node, an access action during an activated energy saving mode period during which an energy saving mode is activated at the at least one micro cell radio network node; at block 1520 wherein the at least one micro cell radio network node comprises a first micro cell radio network node corresponding to a first geographic coverage zone and a second micro cell radio network node corresponding to a second geographic coverage zone, wherein the first geographic coverage zone and the second geographic coverage zone are within a macro cell geographic coverage zone corresponding to the macro cell radio network node, and wherein the performing of the access action with respect to the at least one micro cell radio network node comprises: determining, based on the secondary access information, a first micro cell signal strength corresponding to the first micro cell radio network node to result in a determined first micro cell signal strength; at block 1525 determining, based on the secondary access information, a second micro cell signal strength corresponding to the second micro cell radio network node to result in a determined second micro cell signal strength; at block 1530 determining a highest of the determined first micro cell signal strength or the determined second micro cell signal strength to result in a determined highest micro cell signal strength and to result in a determined micro cell radio network node, of the first micro cell radio network node or the second micro cell radio network node, corresponding to the determined highest micro cell signal strength; and at b lock 1535 based on the determined highest micro cell signal strength, establishing a connection with the determined micro cell radio network node according to a timing advance indicated by the secondary access information as corresponding to the determined micro cell radio network node.

Figure 16:
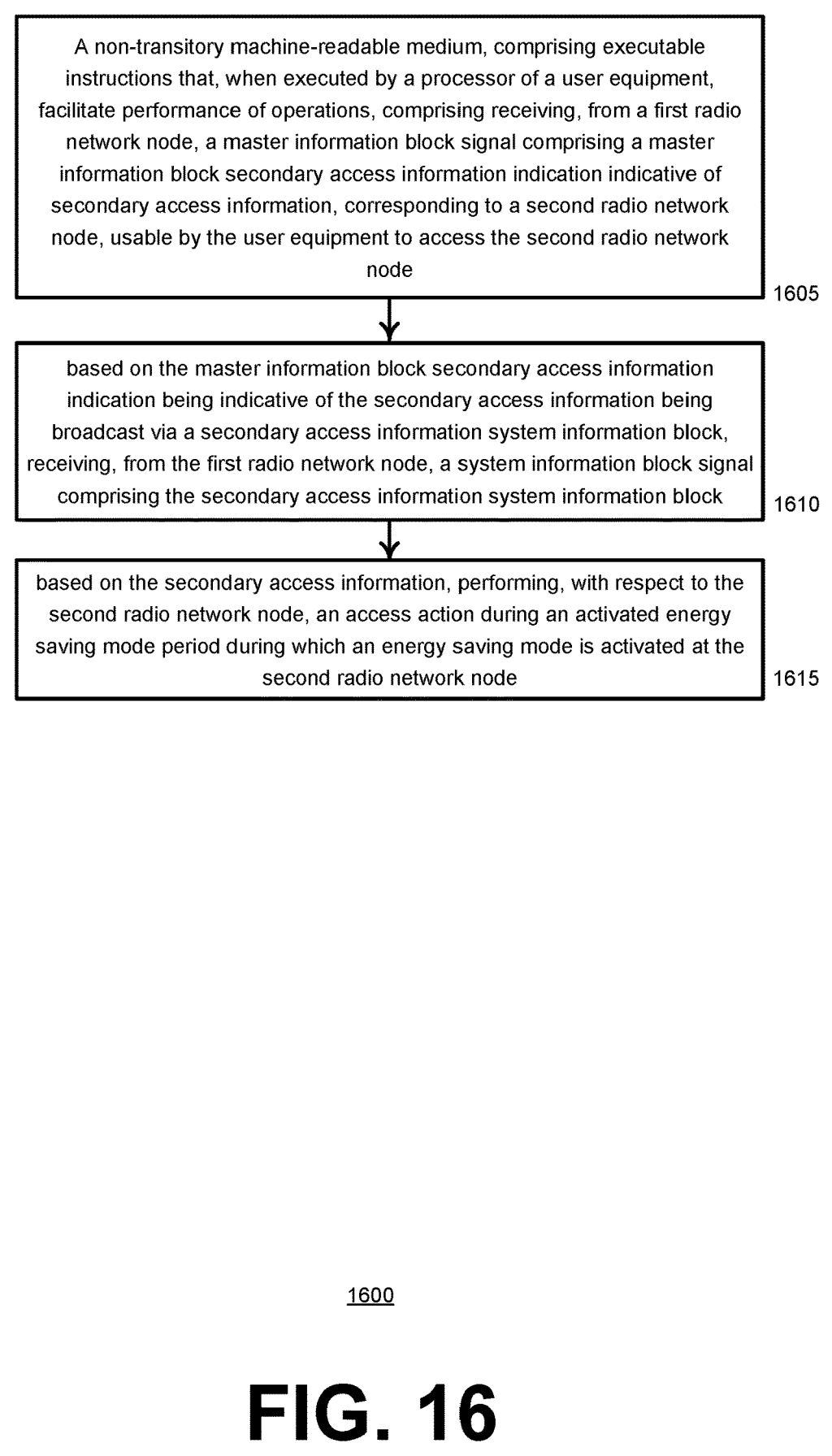

Turning now to FIG. 16, the figure illustrates a non-transitory machine-readable medium 1600 comprising at block 1605 executable instructions that, when executed by a processor of a user equipment, facilitate performance of operations, comprising receiving, from a first radio network node, a master information block signal comprising a master information block secondary access information indication indicative of secondary access information, corresponding to a second radio network node, usable by the user equipment to access the second radio network node; at block 1610 based on the master information block secondary access information indication being indicative of the secondary access information being broadcast via a secondary access information system information block, receiving, from the first radio network node, a system information block signal comprising the secondary access information system information block; and at block 1615 based on the secondary access information, performing, with respect to the second radio network node, an access action during an activated energy saving mode period during which an energy saving mode is activated at the second radio network node.

Figure 17:
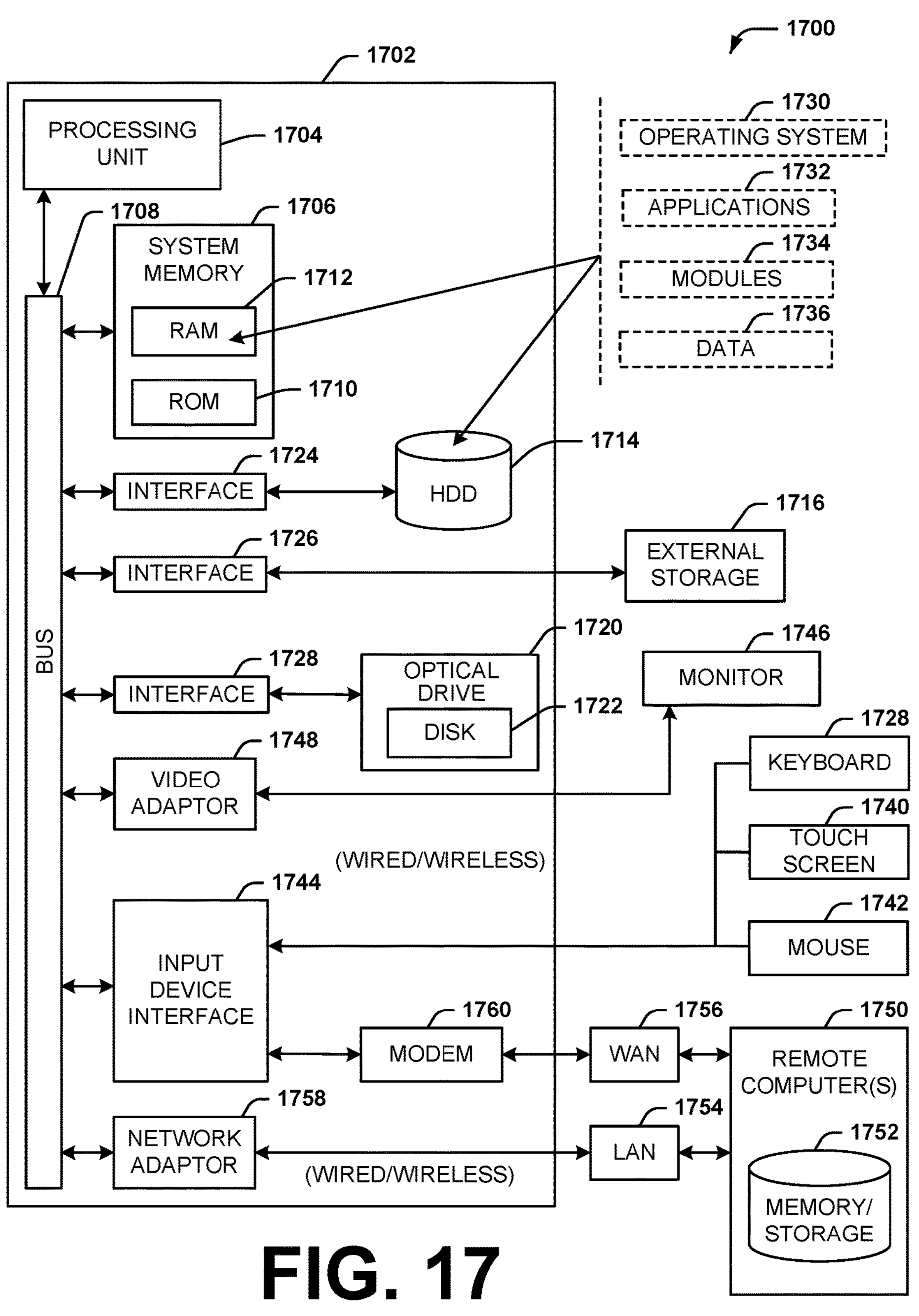
FIG. 17 illustrates an example computer environment.

In order to provide additional context for various embodiments described herein, FIG. 17 and the following discussion are intended to provide a brief, general description of a suitable computing environment 1700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors and may include a cache memory. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can comprise a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN)

1756. Such LAN and WAN networking environments are commonplace in offices and companies, and facilitate enterprise-wide computer networks, such as intranets, all of which can connect to a global communications network, e.g., the internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
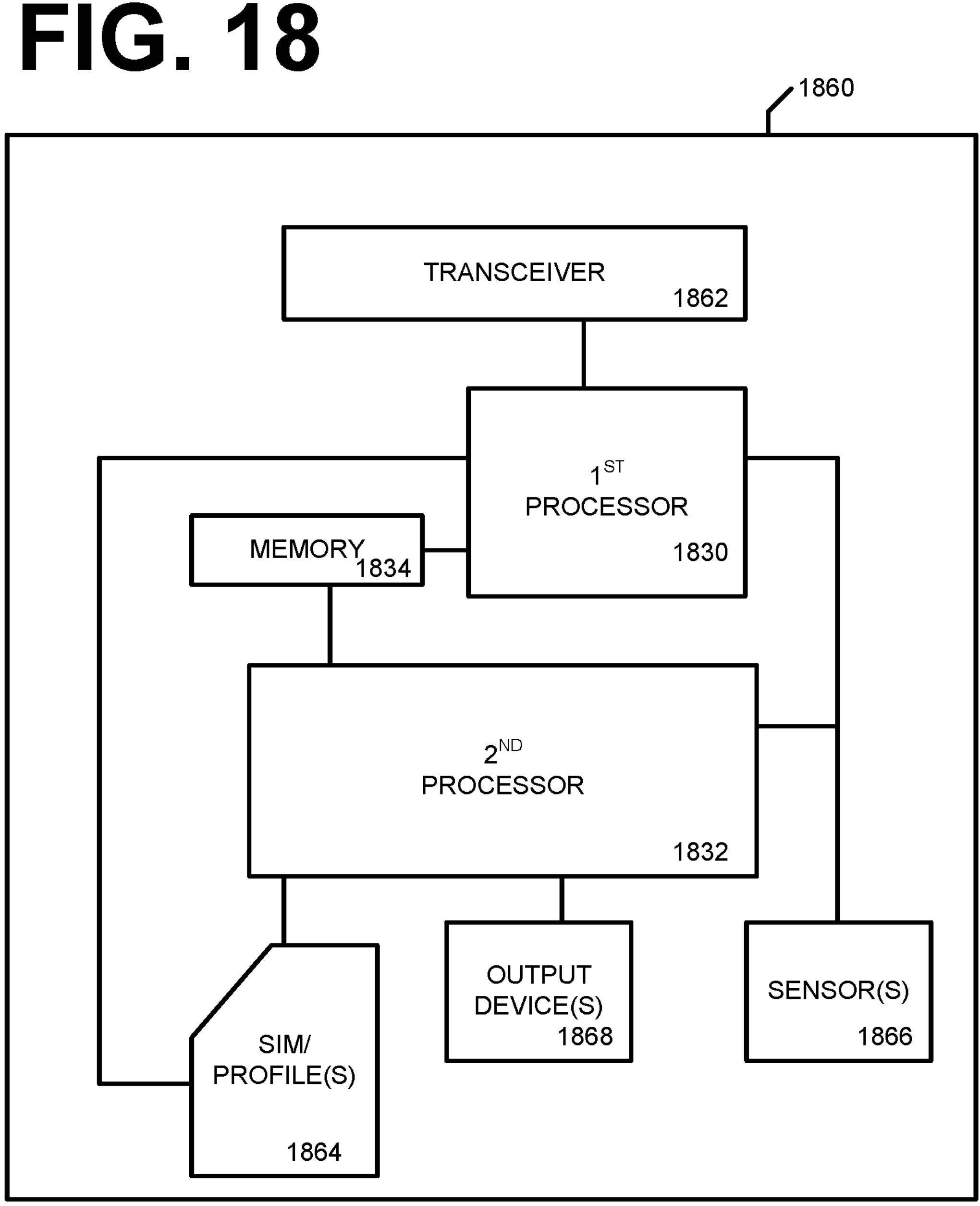
FIG. 18 illustrates a block diagram of an example wireless UE.

Turning to FIG. 18, the figure illustrates a block diagram of an example UE 1860. UE 1860 may comprise a smart phone, a wireless tablet, a laptop computer with wireless capability, a wearable device, a machine device that may facilitate vehicle telematics, a tracking device, remote sensing devices, and the like. UE 1860 comprises a first processor 1830, a second processor 1832, and a shared memory 1834. UE 1860 includes radio front end circuitry 1862, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 18, UE 1860 may also include a SIM 1864, or a SIM profile, which may comprise information stored in a memory (memory 1834 or a separate memory portion), for facilitating wireless communication with RAN 105 or core network 130 shown in FIG. 1. FIG. 18 shows SIM 1864 as a single component in the shape of a conventional SIM card, but it will be appreciated that SIM 1864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1864 and another device, which may be a component of RAN 105 or core network 130 shown in FIG. 1). A SIM profile 1864 may also comprise identifying information that is unique to the SIM, or SIM profile, such as, for example, an International Mobile Subscriber Identity ("IMSI") or information that may make up an IMSI.

SIM 1864 is shown coupled to both the first processor portion 1830 and the second processor portion 1832. Such an implementation may provide an advantage that first processor portion 1830 may not need to request or receive information or data from SIM 1864 that second processor 1832 may request, thus eliminating the use of the first processor acting as a 'go-between' when the second processor uses information from the SIM in performing its functions and in executing applications. First processor 1830, which may be a modem processor or a baseband processor, is shown smaller than processor 1832, which may be a more sophisticated application processor, to visually indicate the relative levels of sophistication (e.g., processing capability and performance) and corresponding relative levels of operating power consumption levels between the two processor portions. Keeping the second processor portion 1832 asleep/inactive/in a low power state when UE 1860 does not need it for executing applications and processing data related to an application provides an advantage of reducing power consumption when the UE only needs to use the first processor portion 1830 while in listening mode for monitoring routine configured bearer management and mobility management/maintenance procedures, or for monitoring search spaces that the UE has been configured to monitor while the second processor portion remains inactive/asleep.

UE 1860 may also include sensors 1866, such as, for example, temperature sensors, accelerometers, gyroscopes, barometers, moisture sensors, and the like that may provide signals to the first processor 1830 or second processor 1832. Output devices 1868 may comprise, for example, one or more visual displays (e.g., computer monitors, VR appliances, and the like), acoustic transducers, such as speakers or microphones, vibration components, and the like. Output devices 1868 may comprise software that interfaces with output devices, for example, visual displays, speakers, microphones, touch sensation devices, smell or taste devices, and the like, that are external to UE 1860.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |
| TA | Timing Advance |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a user equipment comprising a processor from a first radio network node, a master information block signal comprising a master information block secondary access information indication indicative of secondary access information, corresponding to a second radio network node, usable by the user equipment to access the second radio network node;

based on the master information block secondary access information indication being indicative of the secondary access information, receiving, from the first radio network node, a system information block signal comprising the secondary access information; and based on the secondary access information, performing, by the user equipment with respect to the second radio network node, an access action during an activated energy saving mode period during which an energy saving mode is activated at the second radio network node.

2. The method of claim 1, wherein the performing of the access action comprises at least one of: selecting the second radio network node, reselecting the second radio network node, camping on the second radio network node, or establishing a connection with the second radio network node.

3. The method of claim 1, wherein the second radio network node avoids transmitting synchronization signal block signals during the activated energy saving mode period.

4. The method of claim 1, wherein the secondary access information comprises differential access information, corresponding to the second radio network node, that is to be applicable, by the user equipment, to primary access information corresponding to the first radio network node, to determine, by the user equipment, explicit access information corresponding to the second radio network node.

5. The method of claim 1, further comprising:

during a deactivated energy saving mode period, during which the energy saving mode is deactivated at the second radio network node, determining, by the user equipment, at least one radio parameter metric with respect to the second radio network node; and transmitting, by the user equipment to the second radio network node, the at least one radio parameter metric via respective at least one radio parameter metric reports, wherein the at least one radio parameter metric is usable by the second radio network node to generate at least one access performance map comprising at least one radio access performance indicator, indicative of at least one radio access performance metric, corresponding to the second radio network node, and wherein the at least one radio access performance indicator in the at least one access performance map is to be usable by the first radio network node to broadcast as the secondary access information in the system information block signal.

6. The method of claim 5, wherein the determining of the at least one radio parameter metric with respect to the second radio network node comprises:

based on a synchronization signal block signal transmitted by the second radio network node during the deactivated energy saving mode period, determining, by the user equipment, a time difference between a time clock corresponding to the user equipment and a time reference value indicated in the synchronization signal block signal to result in a determined time difference;

wherein the at least one radio parameter metric determined with respect to the second radio network node comprises the determined time difference.

7. The method of claim 5, wherein the determining of the at least one radio parameter metric with respect to the second radio network node comprises:

based on a first synchronization signal block signal transmitted by the first radio network node, determining a first time difference between a time clock corresponding to the user equipment and a first time reference value indicated in the first synchronization signal block signal to result in a determined first time difference;

based on a second synchronization signal block signal transmitted by the second radio network node during the deactivated energy saving mode period, determining a second time difference between the time clock corresponding to the user equipment and a second time reference value indicated in the second synchronization signal block signal to result in a determined second time difference; and based on an offset difference between the determined first time difference and the determined second time difference, determining a downlink synchronization offset, wherein the at least one radio parameter metric determined with respect to the second radio network node comprises the downlink synchronization offset.

8. The method of claim 1, wherein the performing of the access action comprises:

based on a signal strength, corresponding to the second radio network node, indicated by the secondary access information, determining to select the second radio network node; and using a timing advance value, indicated by the secondary access information, establishing a connection with the second radio network node.

9. The method of claim 8, wherein the establishing of the connection with the second radio network node comprises:

avoiding performance of random access with the second radio network node.

10. The method of claim 1, wherein the first radio network node corresponds to a first geographic signal coverage zone, wherein the second radio network node corresponds to a second geographic signal coverage zone, and wherein the second geographic signal coverage zone is within the first geographic signal coverage zone.

11. A user equipment, comprising:

a processor configured to process executable instructions that, when executed by the processor, facilitate performance of operations, comprising:

receiving, from a macro cell radio network node, a master information block signal comprising a master information block secondary access information indication indicative of secondary access information, corresponding to at least one micro cell radio network node, usable by the user equipment to access the at least one micro cell radio network node;

based on the master information block secondary access information indication being indicative of the secondary access information, receiving, from the macro cell radio network node, a system information block signal comprising the secondary access information; and based on the secondary access information, performing, by the user equipment with respect to the at least one micro cell radio network node, an access action during an activated energy saving mode period during which an energy saving mode is activated at the at least one micro cell radio network node.

12. The user equipment of claim 11, wherein the at least one micro cell radio network node comprises a first micro cell radio network node corresponding to a first geographic coverage zone and a second micro cell radio network node corresponding to a second geographic coverage zone, wherein the first geographic coverage zone and the second geographic coverage zone are within a macro cell geographic coverage zone corresponding to the macro cell radio network node, and wherein the performing of the access action with respect to the at least one micro cell radio network node comprises:

determining, based on the secondary access information, a first micro cell signal strength corresponding to the first micro cell radio network node to result in a determined first micro cell signal strength;

determining, based on the secondary access information, a second micro cell signal strength corresponding to the second micro cell radio network node to result in a determined second micro cell signal strength;

determining a highest of the determined first micro cell signal strength or the determined second micro cell signal strength to result in a determined highest micro cell signal strength and to result in a determined micro cell radio network node, of the first micro cell radio network node or the second micro cell radio network node, corresponding to the determined highest micro cell signal strength; and based on the determined highest micro cell signal strength, establishing a connection with the determined micro cell radio network node according to a timing advance indicated by the secondary access information as corresponding to the determined micro cell radio network node.

13. The user equipment of claim 11, wherein the operations further comprise:

determining, during a deactivation period during which the energy saving mode is inactivated at the at least one micro cell radio network node, at least one radio parameter metric corresponding to the at least one micro cell radio network node to result in a determined at least one radio parameter metric; and transmitting, to the at the at least one micro cell radio network node, at least one radio parameter metric report comprising the determined at least one radio parameter metric, wherein the secondary access information is based on the determined at least one radio parameter metric.

14. The user equipment of claim 11, wherein the user equipment is a first user equipment, wherein the secondary access information is based on at least one radio parameter metric, corresponding to the at least one micro cell radio network node, indicated in at least one radio parameter metric report transmitted to the at least one micro cell radio network node by a second user equipment.

15. The user equipment of claim 11, wherein the operations further comprise:

based on a first synchronization signal block signal transmitted by the macro cell radio network node, determining a first time difference between a time clock corresponding to the user equipment and a first time reference value indicated in the first synchronization signal block signal to result in a determined first time difference;

based on at least one second synchronization signal block signal transmitted by the at least one micro cell radio network node during a deactivated energy saving mode period during which an energy saving mode at the at least one micro cell radio network node is inactive, determining at least one second time difference between the time clock corresponding to the user equipment and at least one second time reference value indicated in the at least one second synchronization signal block signal to result in at least one determined second time difference; and based on an offset difference between the determined first time difference and the at least one determined second time difference, determining a downlink synchronization offset, wherein the secondary access information comprises the downlink synchronization offset.

16. A non-transitory machine-readable medium, comprising executable instructions that, when executed by a processor of a user equipment, facilitate performance of operations, comprising:

receiving, from a first radio network node, a master information block signal comprising a master information block secondary access information indication indicative of secondary access information, corresponding to a second radio network node, usable by the user equipment to access the second radio network node;

based on the master information block secondary access information indication being indicative of the secondary access information being broadcast via a secondary access information system information block, receiving, from the first radio network node, a system information block signal comprising the secondary access information system information block; and based on the secondary access information, performing, with respect to the second radio network node, an access action during an activated energy saving mode period during which an energy saving mode is activated at the second radio network node.

17. The non-transitory machine-readable medium of claim 16, wherein the secondary access information system information block indicates the secondary access information according to an access information mode that is one of: an explicit mode corresponding to the secondary access information being broadcast via the secondary access information system information block signal as explicit access information, or a differential mode corresponding to the secondary access information being broadcast via the secondary access information system information block signal as differential access information usable by the user equipment to determine explicit access information corresponding to the second radio network node by applying the differential access information to primary access information corresponding to the first radio network node.

18. The non-transitory machine-readable medium of claim 16, wherein the user equipment is a first user equipment, the operations further comprising:

receiving, from the first radio network node, a downlink synchronization timing estimation request;

responsive to the downlink synchronization timing estimation request, determining a first synchronization time value corresponding to a first synchronization signal block signal broadcast by the first radio network node;

responsive to the downlink synchronization timing estimation request, determining a second synchronization time value corresponding to a second synchronization signal block signal broadcast by the second radio network node during a deactivated energy saving mode period during which the energy saving mode is inactivated at the second radio network node;

determining a synchronization time difference between the first synchronization time value and the second synchronization time value to result in a determined synchronization time difference; and transmitting, to the first radio network node, a synchronization time difference indication indicative of the determined synchronization time difference to be usable by the first radio network node to indicate to a second user equipment the determined synchronization time difference to be usable by the second user equipment to synchronize a clock corresponding to the second user equipment to facilitate use of the secondary access information to access, by the second user equipment, the second radio network node while the energy saving mode is activated at the second radio network node.

19. The non-transitory machine-readable medium of claim 16, wherein the first radio network node corresponds to a first geographic coverage zone, wherein the second radio network node corresponds to a second geographic coverage zone that lies with the first geographic coverage zone, wherein a third radio network node corresponds to a third geographic coverage zone that lies with the first geographic coverage zone, wherein the secondary access information comprises access information corresponding to the third radio network node, and wherein the performing of the access action comprises:

determining a first signal strength corresponding to the second radio network node;

determining a second signal strength corresponding to the third radio network node;

determining a highest of the first signal strength or the second signal strength to result in a determined highest signal strength;

determining the second radio network node or the third radio network node corresponding to the determined highest signal strength to result in a determined radio network node;

determining, from the secondary access information, a timing advance value corresponding to the determined radio network node to result in a determined timing advance; and accessing the determined radio network node according to the determined timing advance.

20. The non-transitory machine-readable medium of claim 19, wherein the performing of the access action further comprises:

avoiding transmission of an uplink preamble to the determined radio network node.

* * * * *